United States Patent
Tabuchi et al.

(10) Patent No.: US 6,802,779 B2
(45) Date of Patent: Oct. 12, 2004

(54) PULLEY TYPE TORQUE TRANSMITTING APPARATUS

(75) Inventors: Yasuo Tabuchi, Toyoake (JP); Junichi Ohguchi, Toyoake (JP); Makoto Ito, Okazaki (JP); Manabu Saiki, Chiryu (JP); Kiyoshi Kurohata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/977,356

(22) Filed: Oct. 16, 2001

(65) Prior Publication Data

US 2002/0052242 A1 May 2, 2002

(30) Foreign Application Priority Data

| Oct. 27, 2000 | (JP) | 2000-328974 |
| Oct. 31, 2000 | (JP) | 2000-333285 |
| Nov. 9, 2000 | (JP) | 2000-342121 |
| Nov. 9, 2000 | (JP) | 2000-342122 |
| Nov. 10, 2000 | (JP) | 2000-343665 |
| Nov. 10, 2000 | (JP) | 2000-343668 |
| Apr. 18, 2001 | (JP) | 2001-120161 |

(51) Int. Cl.[7] .............................................. F16D 9/08
(52) U.S. Cl. ........................... 464/32; 464/76; 474/94
(58) Field of Search ................... 464/73, 74, 32, 464/76, 85, 83, 89; 267/153; 474/94, 902, 903; 417/223, 269

(56) References Cited

U.S. PATENT DOCUMENTS

| 1,504,279 A | * 8/1924 | Spicer ........................ 464/74 |
| 2,446,942 A | * 8/1948 | McFarland .................... 464/74 |
| 2,924,082 A | * 2/1960 | Reich .......................... 464/76 |
| 3,106,076 A | * 10/1963 | Bastow ........................ 464/76 |
| 3,345,831 A | * 10/1967 | Boole .......................... 464/74 |
| 3,505,832 A | * 4/1970 | Braithwaite .................. 464/76 |
| 4,328,879 A | * 5/1982 | Tone ........................ 464/74 X |
| 4,795,402 A | * 1/1989 | Reichardt ................. 464/76 X |
| 4,828,090 A | * 5/1989 | Matsushita ................ 464/89 X |
| 5,899,811 A | 5/1999 | Kishibuchi et al. |
| 6,045,448 A | * 4/2000 | Kern et al. ............... 464/73 X |
| 6,056,514 A | * 5/2000 | Fukai ........................ 417/223 |
| 6,065,943 A | * 5/2000 | Suito et al. ................ 474/94 X |
| 6,612,813 B2 | * 9/2003 | Kimura et al. .......... 417/223 X |

FOREIGN PATENT DOCUMENTS

| DE | 1 575 752 | * 1/1970 | 464/83 |
| DE | 30 38 506 A1 | * 4/1982 | 464/85 |
| GB | 557705 | * 12/1943 | 464/76 |
| IT | 543705 | * 6/1958 | 464/85 |
| JP | 47-45989 | * 11/1972 | 267/153 |

* cited by examiner

Primary Examiner—Greg Binda
(74) Attorney, Agent, or Firm—Posz & Bethards, PLC

(57) ABSTRACT

A hole is formed in a damper rubber, where by when a compressive load is small, pillar portions undergo a flexural deformation so as to result in buckling deformation. On the other hand, when the compressive load becomes large, the hole collapses and the damper rubber undergoes a compressive deformation so as to collapse itself. Thus, since the damper rubber has a non-linear characteristic such that an elastic modulus thereof at an amount of deformation exceeding a predetermined amount is larger than that at an amount of deformation less than the predetermined amount, the transmission of a large torque can be implemented while absorbing a torque fluctuation sufficiently.

13 Claims, 30 Drawing Sheets

ROTATING DIRECTION

ROTATING DIRECTION $\theta = 0°$

θ = 8°

ROTATING DIRECTION

ROTATING DIRECTION

ROTATING DIRECTION

PULLEY TYPE TORQUE TRANSMITTING APPARATUS

CROSS REFERENCE TO RELATED APPLICATION

This application is based on and incorporates herein by reference Japanese Patent Application Nos. 2000-328974 filed on Oct. 27, 2000, 2000-333285 filed on Oct. 31, 2000, 2000-342121 filed on Nov. 9, 2000, 2000-342122 filed on Nov. 9, 2000, 2000-343665 filed on Nov. 10, 2000, 2000-343668 filed on Nov. 10, 2000, and 2001-120161 filed on Apr. 18, 2001.

BACKGROUND OF THE INVENTION

1. Field of the Invention

The present invention relates to a torque transmitting apparatus for transmitting torque from a driving source such as an engine to a rotary device such as an alternator or a compressor disposed within an engine room of a vehicle.

2. Description of Related Art

A rotary device such as a compressor which operates with power provided from an engine undergoes a change in torque fed thereto upon a change in load on the engine. When the torque fed to the rotary device changes, moving components oscillate, with consequent likelihood of noise generation.

The problem may be solved by adopting means such that a torque transfer member formed of an elastic material, that is, rubber, is disposed in a power transfer path extending from a drive source such as an engine up to a rotary device such as a compressor.

In this case, for absorbing a torque variation sufficiently it is desirable that the elastic modulus of the torque transfer member be set small. However, if the elastic modulus is set small, it becomes difficult to transfer a large torque and it is very likely to exceed an elastic limit of the torque transfer member. Thus, the durability of the torque transfer member may be worsened.

In the rotary device such as a compressor or a pump for power steering, required torque required on the rotary device side changes greatly, so that torque acting on a torque transmitting member differs greatly between the case where a torque variation is absorbed in a state in which the required torque is large and the case where a torque variation is absorbed in a state in which the required torque is small.

Therefore, by such a simple way as merely disposing in a power transmission path a torque transmitting member made of an elastic material such as rubber, it is difficult to absorb a torque fluctuation sufficiently in both cases of the required torque being large and small.

SUMMARY OF THE INVENTION

An object of the present invention is to allow a transmission of large torque while absorbing a torque fluctuation to a satisfactory extent.

According to a first aspect of the present invention, a torque transmitting member is deformed mainly by a flexural deformation when the amount of deformation is less than a predetermined amount and is deformed mainly by a compressive deformation when the amount of deformation is more than the predetermined amount. An elastic modulus of the torque transmitting member at a time when an amount of deformation is larger than the predetermined amount becomes larger than that at a time when an amount of deformation is less than the predetermined amount.

Thus, when the transmission torque fed from the driving source to the rotary device is small, the elastic modulus of the torque transmitting member becomes small, so that a fluctuation of the transmitting torque can be absorbed to a satisfactory extent. On the other hand, when the transmitting torque is large, the elastic modulus of the torque transmitting member becomes large, so that the torque transmitting member can be prevented from exceeding its elastic limit.

Thus, not only the transmission of a large torque can be done while absorbing a torque fluctuation sufficiently but also the torque transmitting member can be prevented from exceeding its elastic limit, thereby improving the durability of the torque transfer member.

Here, the elastic modulus of the torque transmitting member represents a change rate, $K (=\Delta T/\Delta\theta)$, of a transmission torque T transmitted between the first rotor and the second rotor relative to a relative rotational angle $\theta$ of the first rotor with respect to the second rotor.

According to a second aspect of the present invention, an elastically deformable elastic member is disposed between a first curved surface of first rotor and a second curved surface of second rotor, and the elastic member is compressed by first and second curved surfaces to transmit a torque from the first rotor to the second rotor. A radius of curvature and a center of curvature of the first curved surface and a radius of curvature and a center of curvature of the second curved surface are made different from each other. Therefore, a change rate of the distance between the first and second curved surfaces at a time when a relative rotational angle of the first rotor with respect to the second rotor exceeds a predetermined amount is larger than a change rate of the distance between the first and second curved surfaces at a time when the relative rotational angle exceeds the predetermined amount.

Thus, when the torque is imposed on the first rotor and the first rotor rotates relatively with respect to the second rotor, as the relative rotational angle ($\theta$) increases, the amount of movement of the first curved surface toward the second curved surface increases.

Consequently, the change rate of the distance between the first and second curved surfaces at a time when the relative rotational angle exceeds the predetermined amount becomes larger than that at a time when the relative rotational angle is less than the predetermined amount. In this case, since the elastic member is disposed between the first and second curved surfaces, as the relative rotational angle increases, the amount of compressive deformation of the elastic member in a non-linear fashion increases. That is, the transmission torque transmitted from the first rotor to the second rotor increases in a non-linear manner as the relative rotational angle becomes larger.

Therefore, even if an elastic material having a relatively large elastic modulus is selected as the elastic member, it is possible to decrease the amount of deflection at a relative rotational angle less than the predetermined amount, so that an elastic material having a relatively large elastic modulus can be used for the elastic member.

Further, since it is possible to prevent the elastic member from exceeding its elastic limit when the transmission torque becomes large, it is possible to transmit a large torque while absorbing a torque variation sufficiently.

According to a third aspect of the present invention, an outer periphery of the second rotor is generally star-shaped so as to have a plurality of projections, with a smooth curved surface being formed between adjacent projections, pins each having a circumferential surface with a radius smaller than a radius of curvature of the curved surface are provided in the first rotor so as to be each positioned between adjacent projections. An elastically deformable elastic member is disposed on the curved surface.

Thus, as the relative rotational angle of the first rotor with respect to the second rotor increases, the amount of compressive deformation of the elastic member increases in a non-linear manner. That is, as the relative rotational angle increases, the transmission torque increases in a non-linear manner.

Thus, even if an elastic material having a relatively large elastic modulus is adopted for the elastic member, it is possible to decrease the amount of deflection at a relative rotational angle less than a predetermined value, so that an elastic material having a relatively large elastic modulus can be used for the elastic member.

Further, since it is possible to prevent the elastic member from exceeding its elastic limit when the transfer torque becomes large, it is possible to effect the transfer of a large torque while absorbing a torque variation sufficiently.

According to a fourth aspect of the present invention, a torque transmitting member is deformable elastically and includes first and second transmitting members accommodated within the same space and having respective portions generally parallel to a compressive load direction which are different in size. When a relative rotational angle of the first rotor with respect to the second rotor is less than a predetermined rotational angle, the its first transmitting member mainly transmits the torque by undergoing a compressive deformation. On the other hand, when the relative rotational angle exceeds the predetermined rotational angle, the first and second transfer members share each other in bearing a compressive load to transmit the torque.

Thus, the relation between the relative rotational angle and the torque transmitted from the first rotor to the second rotor has a non-linear characteristic such that the torque becomes large with the arrival of the relative rotational angle at the predetermined relative rotational angle as a turning point.

The compressive deformation rate as referred to herein means a change rate of the transfer torque with respect to the relative rotational angle. As the compressive deformation rate increases, the transmission torque T with respect to the relative rotational angle becomes large.

Thus, even if a large torque is imposed on the torque transmitting apparatus, it is possible to prevent the torque transmitting member from exceeding its elastic limit, so that a torque fluctuation can be absorbed sufficiently under the transmission of a large torque.

According to a fifth aspect of the present invention, a torque transmitting member is formed so that a change rate of the transmission torque with respect to a relative rotational angle of the first rotor at a time when the first rotor rotates by a first predetermined angle or more in a forward direction relative to the second rotor is larger than the change rate at a time when if the first rotor rotates by a second predetermined angle or less, which is smaller than the first predetermined angle, in a reverse direction relative to the second rotor.

Thus, even if the required torque of the rotary device is large, it is possible to transmit a large torque and absorb a torque fluctuation sufficiently while preventing the torque transmitting member from exceeding its elastic limit.

On the other hand, when the required torque is small, a torque fluctuation can be absorbed even if the change rate is small. Thus, even when the required torque is small, it is possible to absorb a torque fluctuation to a satisfactory extent.

As mentioned above, it is possible to transfer a large torque while absorbing a torque fluctuation to a satisfactory extent.

According to a sixth aspect of the present invention, first and second torque transmitting members are accommodated respectively within plural spaces formed in the circumferential direction within the first and second rotors. The first and second torque transmitting members are elastically deformable and undergo a compressive deformation to transmit the torque. Before compressive deformation of the second torque transmitting member, an inner wall of a space where the second torque transmitting member is accommodated, out of the plural spaces, is spaced by a predetermined gap from the second torque transmitting member in a compressive load direction. When the first torque transmitting member is compressively deformed by a predetermined amount or more, the predetermined distance vanishes and a compressive load is imposed on the second torque transmitting member.

Thus, when the torque is exerted on the first rotor and the first rotor rotates relatively with respect to the second rotor, only the first torque transmitting member is deformed compressively until the relative rotational angle reaches a predetermined relative rotational angle.

When the first torque transmitting member is compressively deformed by the predetermined amount or more and the relative rotational angle reaches the predetermined relative rotational angle, a compressive load is exerted also on the second torque transmitting member, so that both the first and second torque transmitting members are deformed compressively.

Thus, the relation between the relative rotational angle and the torque transmitted from the first rotor to the second rotor has a non-linear characteristic such that as the relative rotational angle increases, the compressive deformation rate of the torque transmitting member increases.

The compressive deformation rate as referred to herein means a change rate of the transmission torque with respect to the relative rotational angle.

Thus, even if a large torque is imposed on the torque transmitting apparatus, it is possible to prevent the torque transmitting member from exceeding its elastic limit, so that a torque fluctuation can be absorbed sufficiently under the transmission of a large torque.

According to a seventh aspect of the present invention, a torque transmitting member is deformable elastically and undergoes a compressive deformation to transmit the torque. When a relative rotational angle of the first rotor with respect to the second rotor is smaller than a predetermined rotational angle, the torque transmitting member undergoes a compressive deformation so that the cross-sectional area in a cross-section nearly perpendicular to the direction of a compressive load imposed on the torque transmitting member increases. When the relative rotational angle is smaller than the predetermined rotational angle, the torque transmitting member undergoes a compressive deformation while inhibiting an increase of the cross-sectional area.

In the case where the compressive deformation takes place so as to bring about an increase of the cross-sectional area, the freedom of the deformation is large in comparison with the case where the compressive deformation takes place in an increase-inhibited state of the cross-sectional area. A change rate (elastic modulus k) of the compressive load with respect to a relative rotational angle of the first rotor relative to the second rotor in case of the compressive deformation being done so as to result in an increase of the cross-sectional area is smaller than the elastic modulus k in case of the compressive deformation being done in an increase-inhibited state of the cross-sectional area.

Thus, the elastic modulus k) of the torque transmitting member at a large relative rotational angle is larger than that at a small relative rotational angle.

Thus, even if a large torque is imposed on the torque transmitting apparatus, it is possible to prevent the torque transmitting member from exceeding its elastic limit and hence possible to absorb a torque fluctuation sufficiently under the transmission of a large torque.

According to an eighth aspect of the present invention, a torque transmitting member accommodated within a space formed within the first and second rotors. The torque transmitting member is deformable elastically and undergoes a compressive deformation to transmit the torque. When a compressive load is not imposed on the torque transmitting member, a gap is formed between a portion of an inner wall of the space which is nearly parallel to the direction of the compressive load and the torque transmitting member.

Thus, when the relative rotational angle is small, the torque transmitting member is deformed compressively so as to increase the cross-sectional area thereof and thereby fill up the gap. After the gap has vanished, the torque transmitting member is compressively deformed in an increase-inhibited state of the cross-sectional area. Therefore, the elastic modulus k of the torque transmitting member is large when the relative rotational angle is large in comparison with the case where the relative rotational angle is small.

Thus, even if a large torque is exerted on the torque transmitting apparatus, it is possible to prevent the torque transmitting member from exceeding its elastic limit and hence possible to absorb a torque fluctuation sufficiently under the transmission of a large torque.

According to a ninth aspect of the present invention, a torque transmitting member accommodated within a space formed within first and second rotors, the torque transmitting member is deformable elastically and undergoes a compressive deformation to transmit the torque. An end portion of the torque transmitting member in a direction nearly parallel to the direction of a compressive load acting on the torque transmitting member is tapered so as to be smaller in cross-sectional area toward a front end side thereof. Therefore, when a compressive load is not imposed on the torque transmitting member, a gap is formed between an inner wall of the space and the torque transmitting member.

Thus, the torque transmitting member is deformed compressively so that the gap becomes smaller as the relative rotational angle increases from the state of it being zero. Thus, the torque transmitting member has a non-linear characteristic such that as the relative rotational angle increases, the elastic modulus k increases.

Therefore, even if a large torque acts on the torque transmitting apparatus, it is possible to prevent the torque transmitting member from exceeding its elastic limit and hence possible to absorb a torque fluctuation sufficiently under the transmission of a large torque.

According to a tenth aspect of the present invention, the torque transmitting member is deformable elastically and undergoes a compressive deformation to transmit the torque. The torque transmitting member is deformed compressively so that at least when a relative rotational angle of the first rotor with respect to the second rotor is smaller than a predetermined rotational angle, as the relative rotational angle increases, the area of contact between a portion of an inner wall of the space which is nearly parallel to the direction of the compressive load and the torque transmitting member increases.

Thus, the torque transmitting member is deformed compressively in such a manner that the freedom of deformation becomes smaller as the relative rotational angle increases from the state of it being zero. As a result, the torque transmitting member comes to have a non-linear characteristic such that as the relative rotational angle increases, the elastic modulus k of the torque transmitting member increases.

Thus, even if a large torque acts on the torque transmitting apparatus, the torque transmitting member can be prevented from exceeding its elastic limit and so it is possible to absorb a torque fluctuation to a satisfactory extent under the transmission of a large torque.

According to an eleventh aspect of the present invention, a torque transmitting member is accommodated within a space formed within first and second rotors. The torque transmitting member is deformable elastically and undergoes a compressive deformation to transmit the torque. When a compressive load is not imposed on the torque transmitting member, a gap is formed between an inner wall of the space and the torque transmitting member.

Thus, the torque transmitting member is deformed compressively so that the gap becomes smaller as the relative rotational angle increases from the state of it being zero. As a result, the torque transmitting member comes to have a non-linear characteristic such that as the relative rotational angle increases, the elastic modulus k thereof increases.

Thus, even if a large torque acts on the torque transmitting apparatus, it is possible to prevent the torque transmitting member from exceeding its elastic limit and hence possible to absorb a torque fluctuation to a satisfactory extent under the transmission of a large torque.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a front view showing a pulley body (second embodiment);

DETAILED DESCRIPTION OF PREFERRED EMBODIMENTS (First Embodiment)

Figure 1:
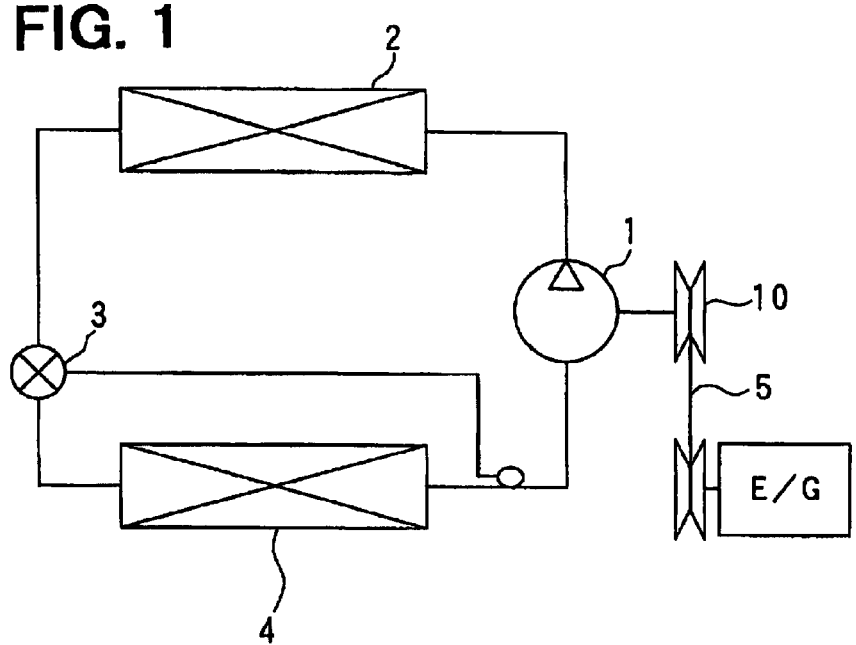
FIG. 1 is a schematic view showing a refrigeration cycle for a vehicle air conditioner (first embodiment)

In the first embodiment, the present invention is applied to a torque transmitting apparatus for the transmitting a power from a vehicle engine to a compressor for a vehicular air conditioner. FIG. 1 is a schematic view showing a refrigeration cycle for the vehicle air conditioner.

A compressor 1 sucks and compresses a refrigerant. A condenser 2 cools the refrigerant discharged from the compressor 1. A pressure reducing device 3 reduces the pressure of the refrigerant flowing out of the condenser 2. An evaporator 4 evaporates the refrigerant pressure-reduced by the pressure reducing device 3, thereby allowing the refrigerant to cool an air passing through the evaporator 4.

Here, in the present embodiment, as the pressure reducing device 3, a thermostatic expansion valve is used for adjusting an opening degree thereof so that the refrigerant at an outlet side of the evaporator 4 has a predetermined superheat.

A pulley type torque transmitting apparatus 10 transmits a power of the engine E/G through a V belt 5 to the compressor 1. The pulley type torque transmitting apparatus 10 will be described.

Figure 2:
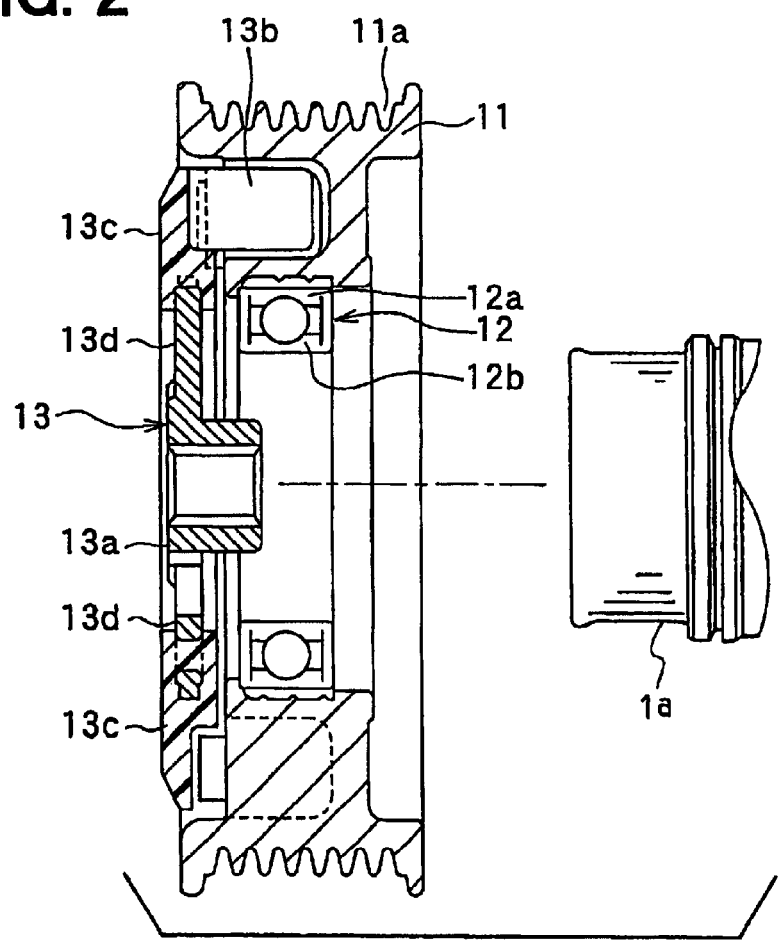
FIG. 2 is a cross-sectional view showing a pulley (first embodiment)

FIG. 2 is a cross-sectional view showing the pulley type torque transmitting apparatus 10. A metal pulley body 11 includes V grooves 11a for around which a V-belt 5 is hung. The pulley body 11 receives the driving force from the engine E/G and rotates.

A radial bearing 12 supports the pulley body 11 rotatably. An outer race 12a of the radial bearing is press-fitted and fixed into the pulley body 11, and a front housing of the compressor 1 is inserted into an inner race 12b. A radial load induced by the tension of the V belt 5 can be received by the front housing of the compressor 1 without being received by a shaft of the compressor.

Figure 3:
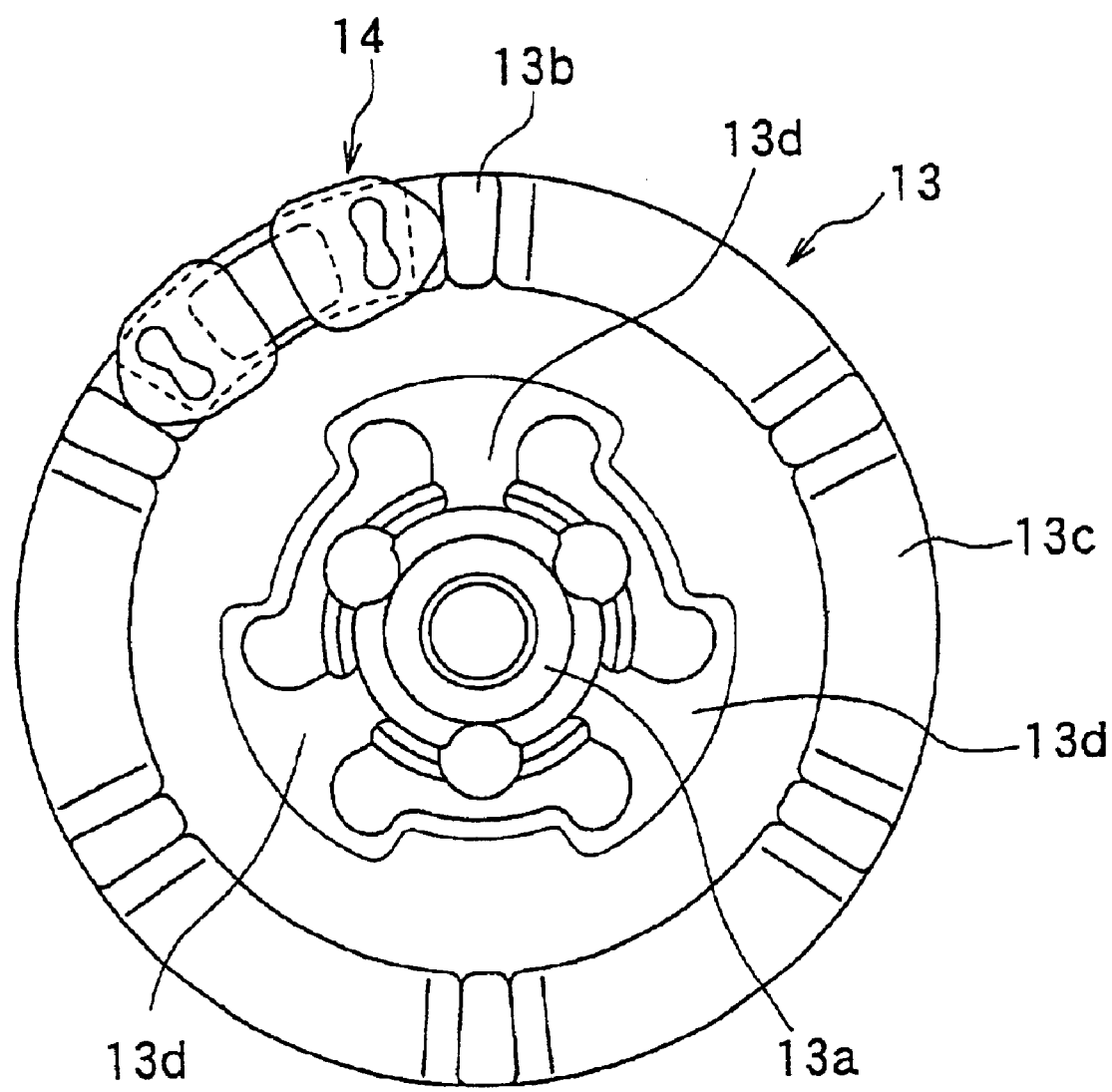
FIG. 3 is a front view showing a center hub (first embodiment)

A center hub 13 is connected to the shaft of the compressor 1 and adapted to rotate together with the shaft. As shown in FIG. 3, the center hub 13 includes a cylindrical portion 13a having a cylindrical inner peripheral surface which is splined for coupling with a splined outer peripheral surface of the shaft, an annular portion 13c formed with plural projections 13b which receive torque fed from the pulley body 11, and a bridge portion 13d which provides a mechanical connection between the annular portion 13c and the cylindrical portion 13a to transmit the torque from the annular portion 13c to the cylindrical portion 13a.

The strength of the bridge portion 13d is set at a value at which it breaks when the torque transferred from the annular portion 13c to the cylindrical portion 13a becomes a predetermined torque or higher. Thus, the bridge portion 13d functions as a torque limiter mechanism which limits a maximum torque capable of being transmitted from the engine E/G to the compressor 1. FIG. 2 shows that the torque limiter mechanism, or bridge portion 13d, is arranged in such a manner that the axial extent of the torque limiter mechanism is within the axial extent of the pulley 11.

The cylindrical portion 13a and the bridge portion 13d are made o metal and integrally formed. The annular portion 13c is formed by molding a resin, the bridge portion 13d and the annular portion 13c are integrally formed by insert molding.

Figure 4:
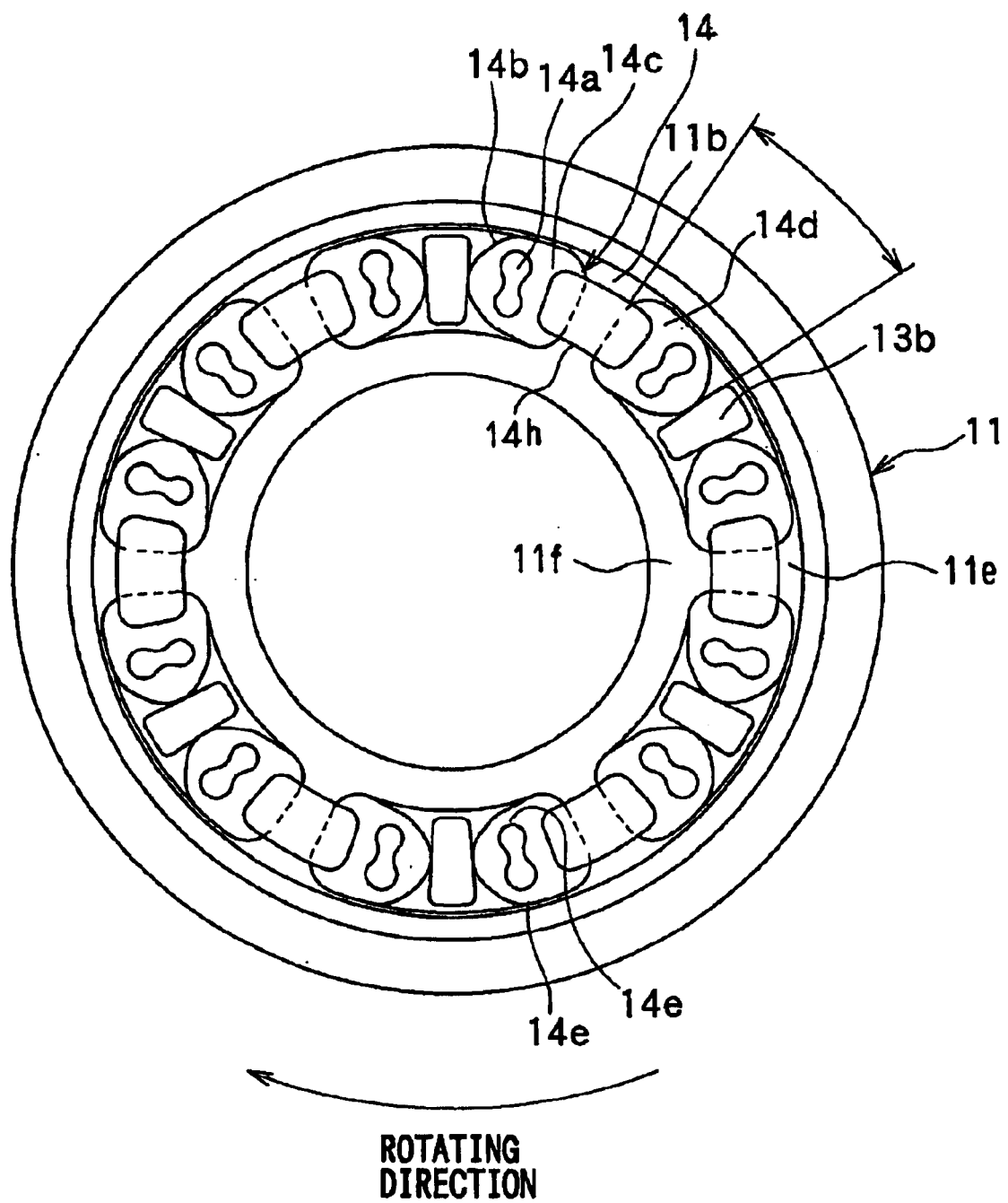
FIG. 4 is a front view showing a pulley body (first embodiment)
Figure 5:
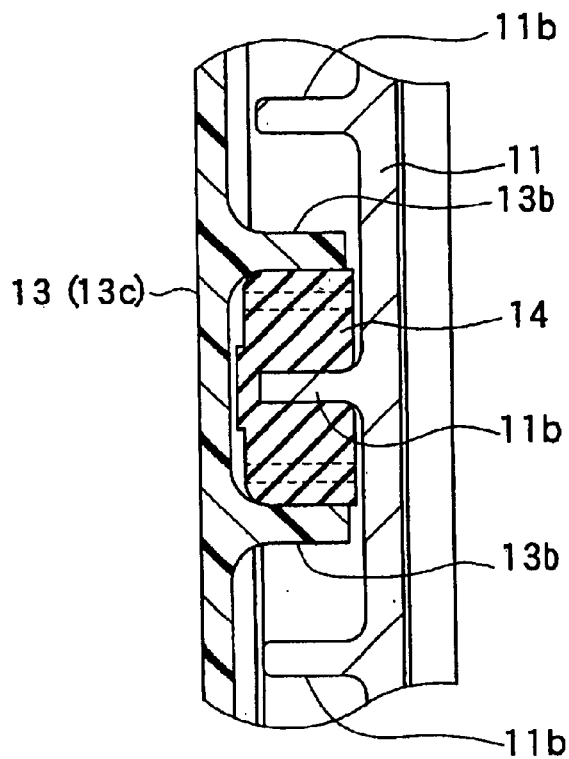
FIG. 5 is an enlarged cross-sectional view showing a mounted state of a damper rubber (first embodiment)

At the portion of the pulley body 11 corresponding to the annular portion 13c, there are formed plural projections 11b integrally so as to project from the pulley body 11 toward the annular portion 13c as shown in FIG. 4. Each projection 11b radially and inwardly extends from an outer annular portion 11e of the pulley body 11 to an inner annular portion 11f of the pulley body 11, which is radially and inwardly spaced from the outer annular portion 11e. With the pulley body 11 and the center hub 13 mounted on the compressor 1, the projections 13b of the center hub 13 and the projections 11b of the pulley body 11 are positioned alternately around the shaft, as shown in FIG. 5.

Between both adjacent projections 11b and 13b, a damper rubber 14 is disposed. The damper rubber 14 is made of EPDM (ethylene-propylene-diene terpolymer rubber) in the present embodiment for being deformed elastically. The damper rubber 14 transmits the torque received by the pulley body 11 to the center hub 13.

The damper rubber 14 includes a damper body 14d. The damper body 14d includes a first deforming portion 14b having a hole 14a and a second deforming portion 14c having no hole 14a. The hole 14a is reduced in cross-sectional area nearly perpendicular to a compressive load direction. Two such damper bodies 14d are interconnected by a connecting member 14h as one set, which set is inserted between projections 11b and 13b at plural positions, as shown in FIGS. 4 and 5.

When the pulley body 11 rotates, as shown in FIG. 4, the pulley body 11 shifts its position so as to reduce the size between both projections 11b and 13b (see arrow), so that a compressive force acts on the damper rubber 14.

At this time, since the hole 14a is formed in the first deforming portion 14b, when a compressive load is imposed on the damper rubber 14, pillar portions 14e of the hole 14a which are nearly parallel to the load direction undergo a flexural deformation so as to result in buckling deformation.

As the compressive load further increases and the buckling deformation of the pillar portions 14e becomes more conspicuous, the hole 14a collapses and the damper rubber 14 undergo a compressive deformation so as to collapse itself. At this time, the buckling deformation proceeds at a relatively small compressive load, while the compressive deformation requires a larger compressive load in comparison with the buckling deformation.

Figure 6:
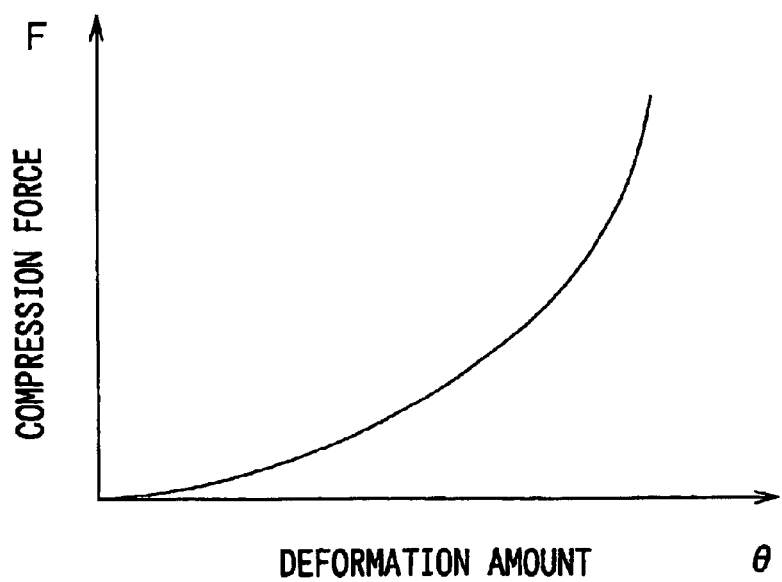
FIG. 6 is a graph showing a relation between an amount of deformation and a compressive load (first embodiment)

Thus, when the amount of deformation is not more than a predetermined amount, the damper rubber 14 is deformed mainly by a flexural deformation. On the other hand, when the amount of deformation exceeds the predetermined amount, the damper rubber 14 is deformed mainly by a compressive deformation. Thus, as shown in FIG. 6, the damper rubber 14 undergoes an elastic deformation so as to have a non-linear characteristic such that an elastic modulus of the damper rubber at an amount of deformation exceeding the predetermined amount is larger than that at an amount of deformation not more than the predetermined amount.

The elastic modulus of the damper rubber 14 represents a change rate, K (where $K=\Delta T/\Delta\theta$, T represents torque, and $\theta$ represents the rotational angle), of a transfer torque transferred between the pulley body 11 and the center hub 13 relative to the relative rotational angle of the pulley body 11 with respect to the center hub 13.

Therefore, when the transmission torque fed from the engine E/G to the compressor 1 is small, the elastic modulus of the damper rubber 14 becomes small and hence it is possible to absorb a variation of the transfer torque sufficiently. On the other hand, when the transfer torque is large, the elastic modulus of the damper rubber 14 is large and hence it is possible to prevent the damper rubber 14 from exceeding its elastic limit.

Besides, since not only the transfer of a large torque can be attained while absorbing a variation of torque sufficiently but also it is possible to prevent the damper rubber 14 from exceeding its elastic limit, it is possible to improve the durability of the damper rubber 14.

Further, since a non-liner characteristic can be obtained with simple constitution such that the hole 14a is formed in a damper rubber 14, the manufacturing cost of the pulley type torque transmitting apparatus 10 is reduced while attaining the transfer of a large torque under sufficient absorption of a torque variation.

Figure 7:
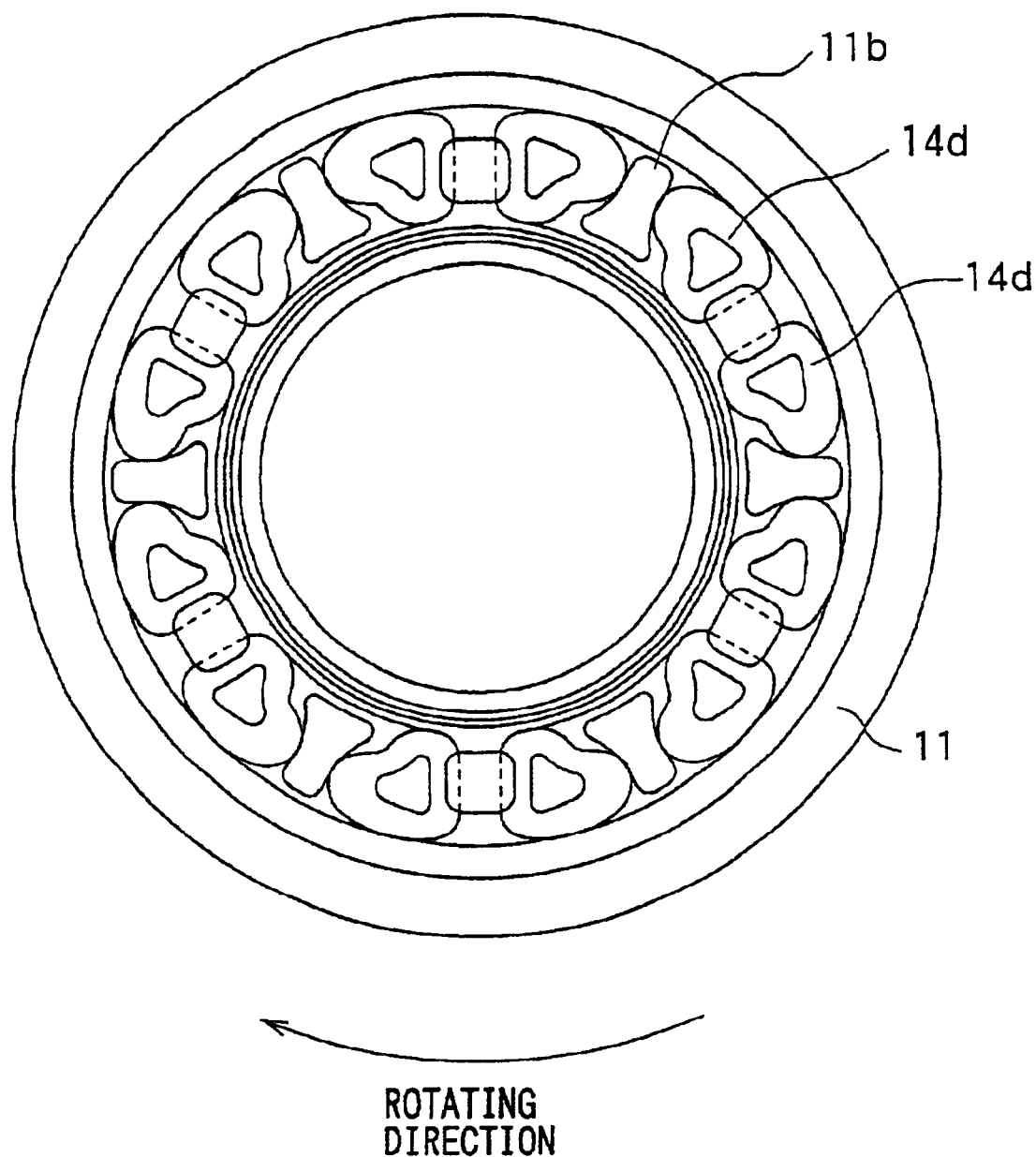
FIG. 7 is a front view showing a modified example of the pulley body (first embodiment)

The shape of the hole 14a in the present embodiment is not limited to such a loofah shape as shown in FIG. 4, but it may be, for example, a triangular shape as shown in FIG. 7.

(Second Embodiment)

Figure 8:
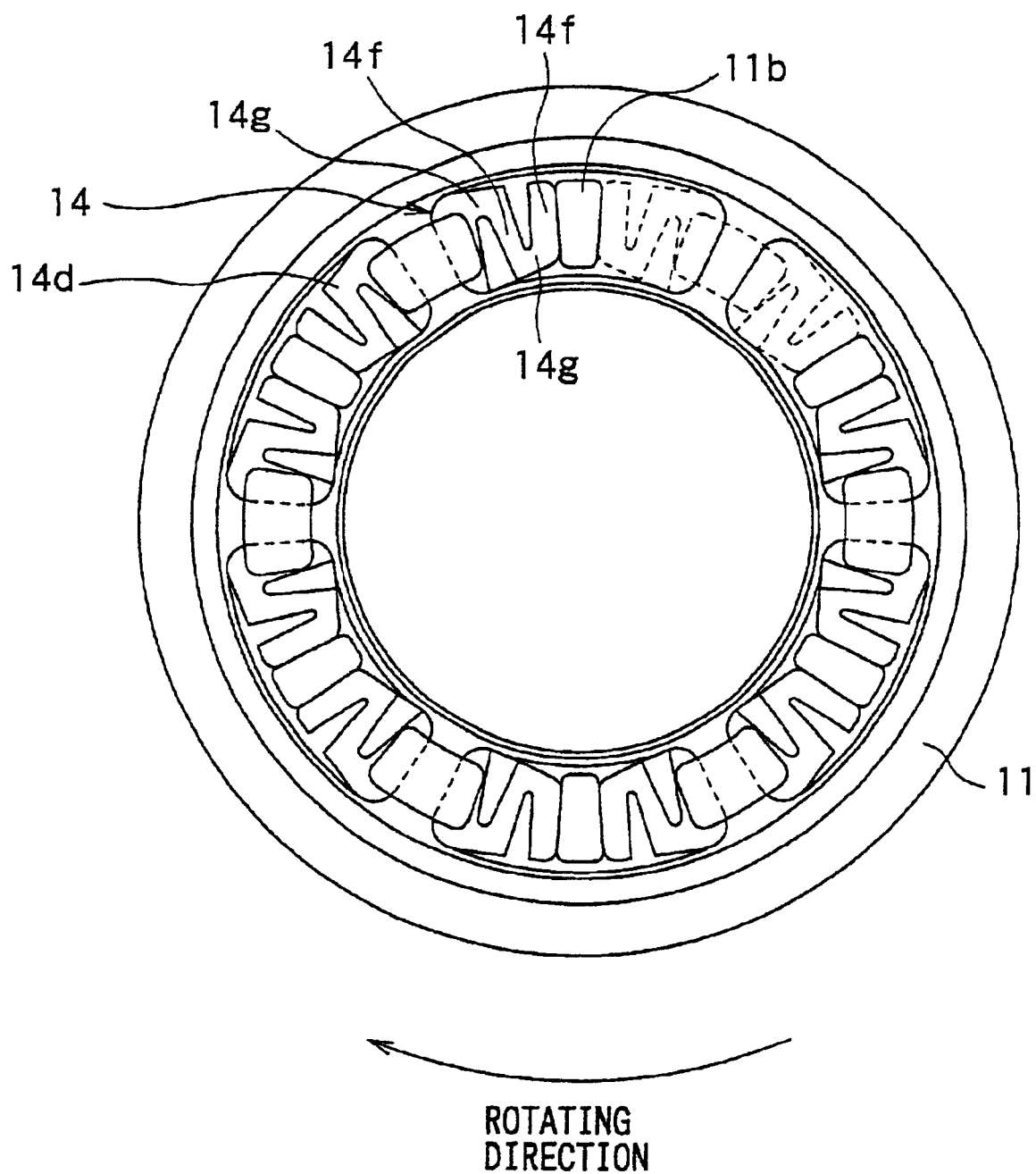

In the second embodiment, as shown in FIG. 8, a damper rubber 14 is formed in S shape so as to extent in a compressive load direction while meandering, thereby affording a non-linear characteristic.

In the second embodiment, when the compressive load is not more than a predetermined amount, beam portions 14f undergo a flexural deformation like compression of a coiled spring, and when the compressive load exceeds the predetermined amount, the beam portions 14f undergo a compressive deformation so that the damper rubber 14 itself collapse in a closely contacted state of the beam portions 14f. The beam portions 14f indicate portions extending from bent portions 14g in a direction perpendicular to the compressive load direction.

At this time, a buckling deformation proceeds at a relatively small compressive load, while the compressive deformation requires a large compressive load in comparison with the buckling deformation, thereby obtaining a non-linear characteristic.

In the second embodiment, two bent portions 14g are formed to afford an S shape. Alternatively, only one bent portion 14g may be formed to afford a V shape, or three or more bent portions 14g may be formed.

Further, since a non-linear characteristic can be obtained by such a simple constitution as forming the damper rubber 14 in S shape, the manufacturing cost of the pulley type torque transmitting apparatus 10 can be reduced while attaining the transfer of a large torque under sufficient absorption of a torque variation.

(Third Embodiment)

Figure 9:
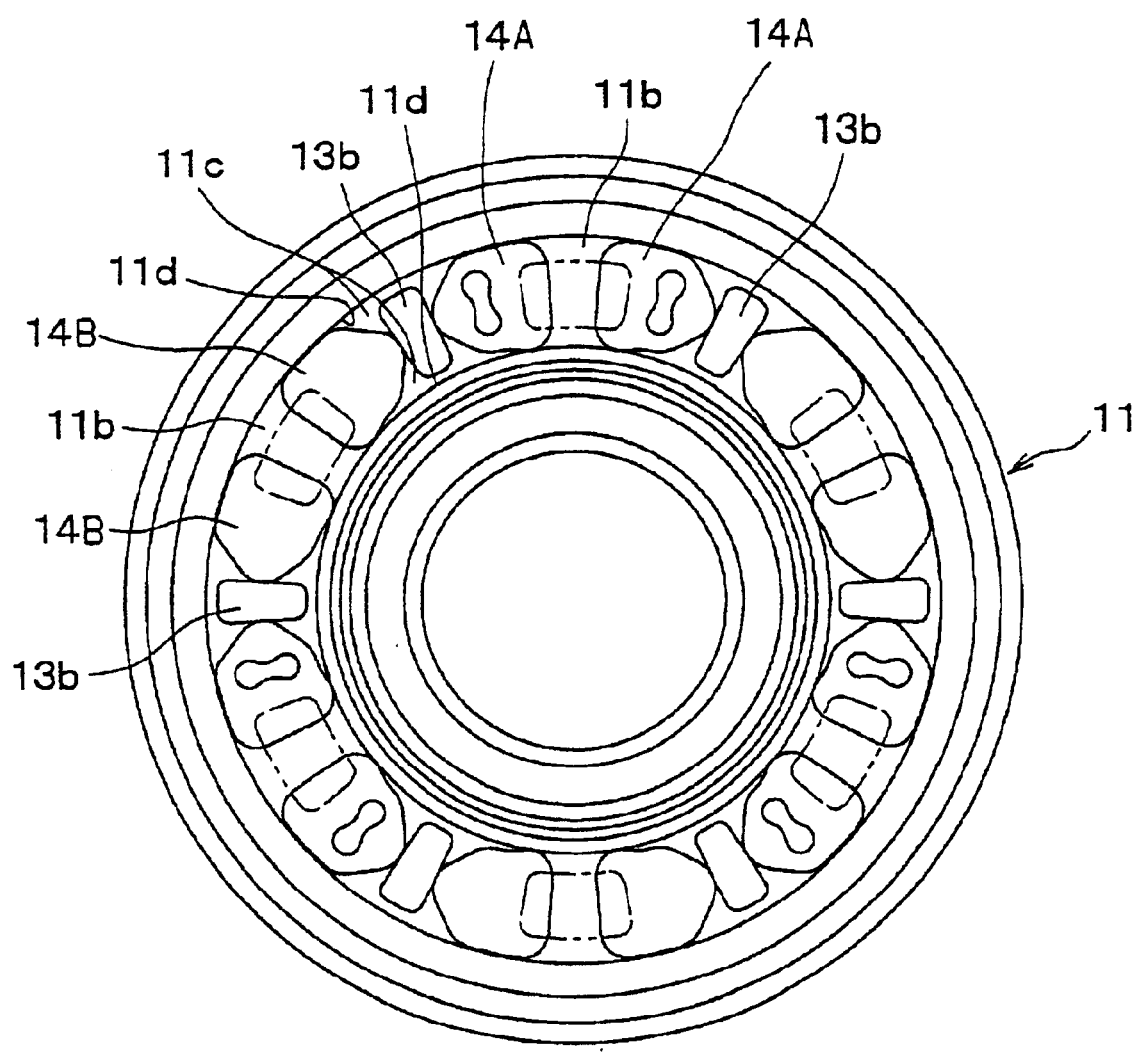
FIG. 9 is a front view showing a pulley body (third embodiment)

All of plural damper rubbers 14 used in the above first and second embodiments are of the same characteristic, but in the third embodiment, as shown in FIG. 9, two types of dampers 14A and 14B different in characteristic are used to obtain a desired characteristic.

The damper 14A has the same shape and characteristic as the damper rubber 14 used in the first embodiment. Meanwhile, as shown in FIG. 9, an end portion of the damper 14B in the rotational direction of the pulley body 11 is tapered so that the cross-sectional area thereof becomes smaller toward the front end side thereof. When the relative rotational angle $\theta$ of the pulley body 11 with respect to the center hub 13 is smaller than a predetermined rotational angle $\theta1$, the damper 14B undergoes a compressive deformation so that the sectional area of a section of the damper 14B perpendicular to the compressive load direction increases. On the other hand, when the relative rotational angle $\theta$ is not less than the predetermined rotational angle $\theta1$, the damper 14B undergoes a compressive deformation in a state in which an increase of the sectional area is inhibited by a space 11c and an inner wall 11d.

In the case where the damper 14B undergoes a compressive deformation so as to induce an increase of the cross-sectional area, the degree of freedom of the deformation is larger than in the case where the damper 14B undergoes a compressive deformation in an increase-inhibited state of the cross-sectional area, so that the elastic modulus of the damper 14B in the former case is smaller than that in the latter case.

Thus, when the relative rotational angle θ of the pulley body 11 is smaller than the predetermined rotational angle θ1, the damper 14B undergoes a compressive deformation so that the area of contact between the space 11c (inner wall 11d) and the damper 14B increases as the relative rotational angle θ increases. Thus, the damper 14B comes to have a non-linear characteristic such that the larger the relative rotational angle θ, the larger the elastic modulus of the damper.

In the third embodiment, the damper 14B has a non-linear characteristic. Alternatively, the damper 14B may have a linear characteristic.

In the above-described first through third embodiments, the damper rubber 14 is made of EPDM. Alternatively, the damper rubber 14 may be formed using another material, e.g., elastomer, resin, or metal.

In the above-described first through third embodiments, the present invention is applied to the pulley type torque transmitting apparatus 10 which transmits the torque to the compressor 1. Alternatively, the present invention may be applicable to any other torque transmitting device.

In the above-described first through third embodiments, the hole 14a is a through hole. Alternatively, the hole 14a may be a recess or the like which is not a through hole.

(Fourth Embodiment)

Figure 10:
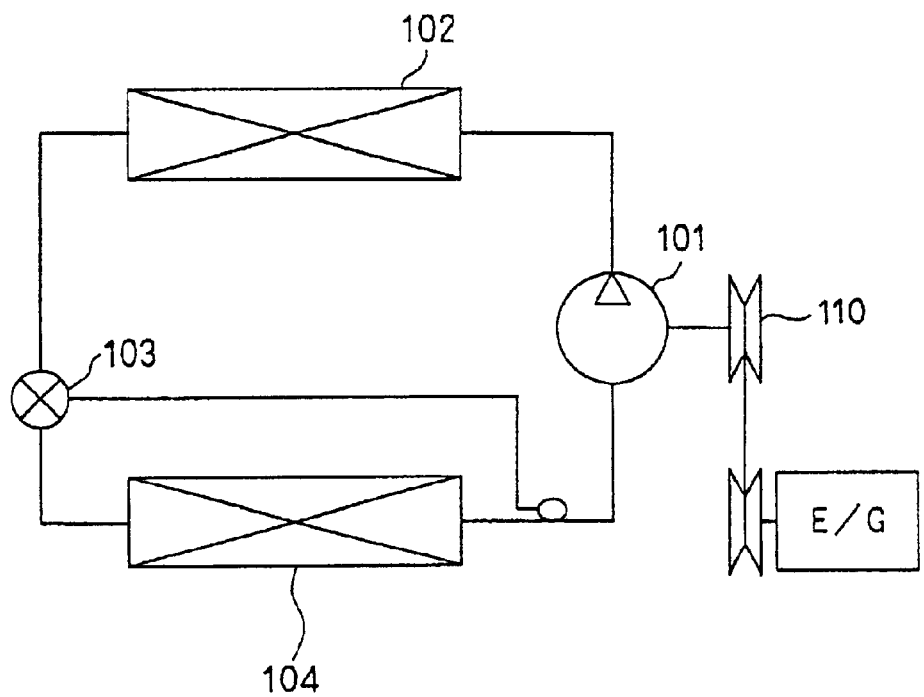
FIG. 10 is a schematic view showing a refrigeration cycle for a vehicle air conditioner (fourth embodiment)

In the fourth embodiment, the present invention is applied to a torque transmitting apparatus for the transmitting a power from a vehicle engine to a compressor for a vehicular air conditioner. FIG. 10 is a schematic view showing a refrigeration cycle for the vehicle air conditioner.

A compressor 101 sucks and compresses a refrigerant. A condenser 102 cools the refrigerant discharged from the compressor 101. A pressure reducing device 103 reduces the pressure of the refrigerant flowing out of the condenser 102. An evaporator 104 evaporates the refrigerant pressure-reduced by the pressure reducing device 103, thereby allowing the refrigerant to cool an air passing through the evaporator 104.

Here, in the present embodiment, as the pressure reducing device 103, a thermostatic expansion valve is used for adjusting an opening degree thereof so that the refrigerant at an outlet side of the evaporator 104 has a predetermined superheat.

A pulley type torque transmitting apparatus 110 transmits a power of the engine E/G through a V belt (not illustrated) to the compressor 101. The pulley type torque transmitting apparatus 110 will be described.

Figure 11:
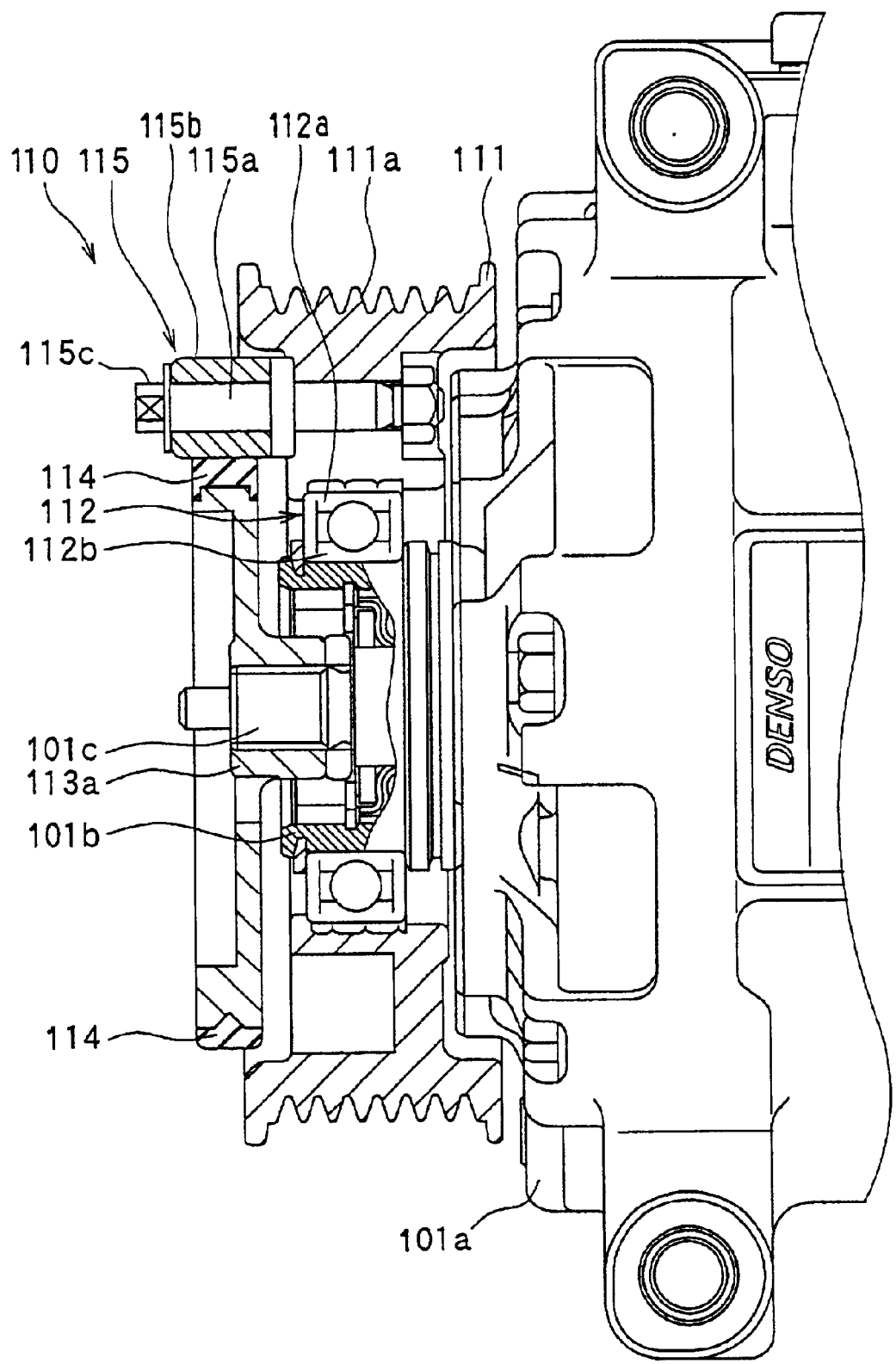
FIG. 11 is a cross-sectional view showing a pulley (fourth embodiment)

FIG. 11 is a cross-sectional view showing the pulley type torque transmitting apparatus 110. A metal pulley body 111 includes V grooves 111a for around which a V-belt is hung. The pulley body 111 receives the driving force from the engine E/G and rotates.

A radial bearing 112 supports the pulley body 111 rotatably. An outer race 112a of the radial bearing 112 is press-fitted and fixed into the pulley body 111 and a cylindrical portion 101b formed in a front housing 101a of the compressor 101 is inserted into an inner race 112b. Thus, a radial load induced by the tension of the V belt can be received by the front housing 101a of the compressor 101 without being received by a shaft 101c of the compressor 101.

A center hub 113 is connected to the shaft 101c of the compressor 101 and adapted to rotate together with the shaft 101c. The center hub 113 is disposed coaxially with the pulley body 111.

Figure 12:
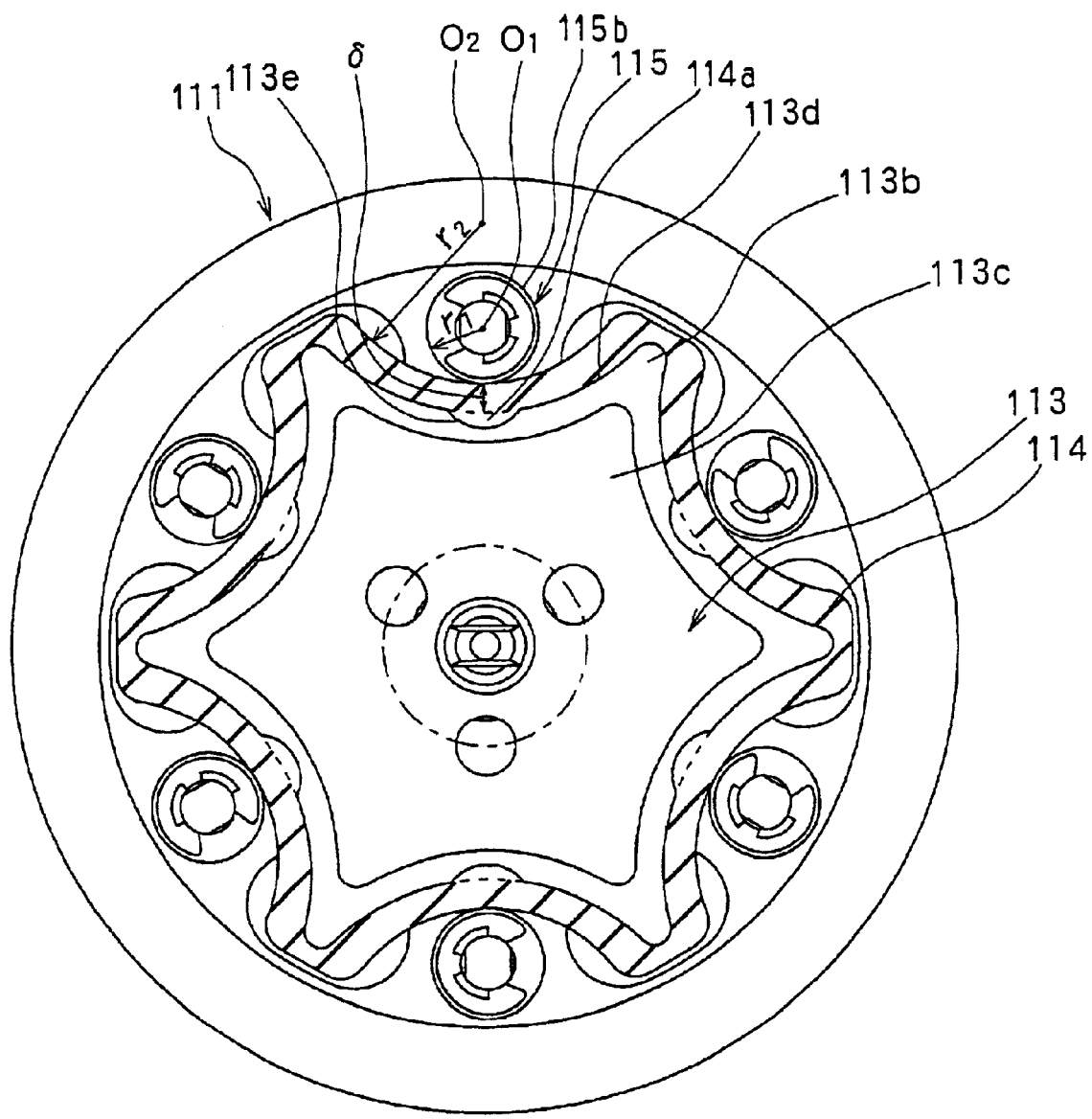
FIG. 12 is a front view showing a pulley body (fourth embodiment)

The center hub 113 includes a cylindrical portion 113a having a cylindrical inner peripheral surface formed with internal threads for coupling with external threads formed on an outer peripheral surface of the shaft 101c, and: a flange portion 113c formed in a star shape so as to have plural projections 113b on its outer periphery, as shown in FIG. 12. The cylindrical portion 113a and the flange portion 113c are made of metal and integrally formed.

Between adjacent projections 113b, a smooth curved surface 113d having a radius of curvature larger than the radius of a roller 115 is formed. A damper 114 (hatched portion in FIG. 12) made of elastically deformable material (EPDM (ethylene propylene diene terpolymer rubber) is disposed on the curved surface 113d.

In the present embodiment, a recess 113e, which is concave on the cylindrical portion 113a side, is formed within the curved surface 113, while a protrusion 114a to be fitted in the recess 113e is formed on the damper 114, to prevent displacement of the damper 114 relative to the flange portion 113c. Therefore, when the damper 114 is bonded to the curved surface 113d by a bonding method such as adhesion by vulcanization, the recess 113e and the protrusion 114a may be omitted.

The metallic roller 115 is formed so as to have a circumferential surface with a radius of curvature r1 smaller than a radius of curvature r2 of the curved surface 113d. As shown in FIG. 11, the roller 115 is rotatably supported by the pulley body 11 so as to be positioned between adjacent projections 113b through a pin 115a which is press-fitted and fixed into the pulley body 111. An E-shaped retaining ring 115c prevents the roller 115 from coming off the pin 115a.

In the fourth embodiment, with an outer peripheral surface 115b and the curved surface 113d opposed to each other, the radius of curvature r1 of the outer peripheral surface 115b ("first curved surface 115b" hereinafter) of the roller 115 and a center of radius O1 thereof, and the radius of curvature r2 of the curved surface 113d ("the second curved surface 113d" hereinafter) and a center of curvature O2 thereof, are different from each other, the first curved surface 115b is positioned on a more radially outer side than the second curved surface 113d, and both curved surfaces 115b and 113d are convex toward a rotational center side of the pulley body 111 and the center hub 113.

In the fourth embodiment, as noted above, the radius of curvature r1 of the first curved surface 115b and the center of curvature O1 thereof, and the radius of curvature r2 of the second curved surface 113d and the center of curvature O2 thereof, are different from each other, so that the first curved surface 115b is positioned on a more radially outer side than the second curved surface 113d, and both curved surfaces 115b and 113d are convex toward the rotational center side of the pulley body 111 and the center hub 113. Thus, torque is imposed on the pulley body 111, and when the pulley body 111 rotates relatively with respect to the center hub 113, the larger the relative rotational angle θ, the larger the amount of movement of the first curved surface 115b toward the second curved surface 113d, as shown in FIGS. 13 and 14.

Figure 13:
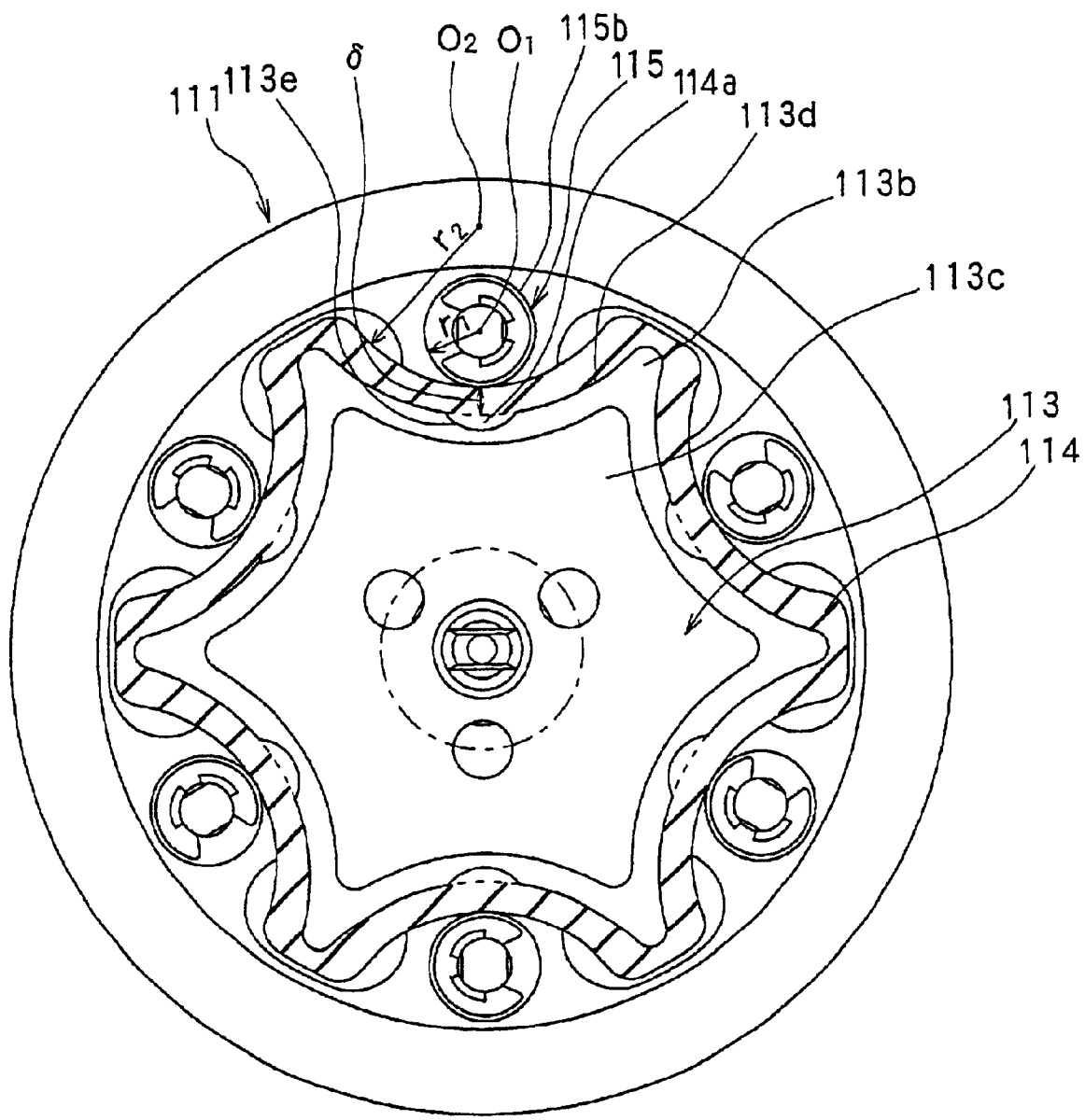
FIG. 13 is a front view showing the pulley at a relative rotational angle of 0° (fourth embodiment)
Figure 14:
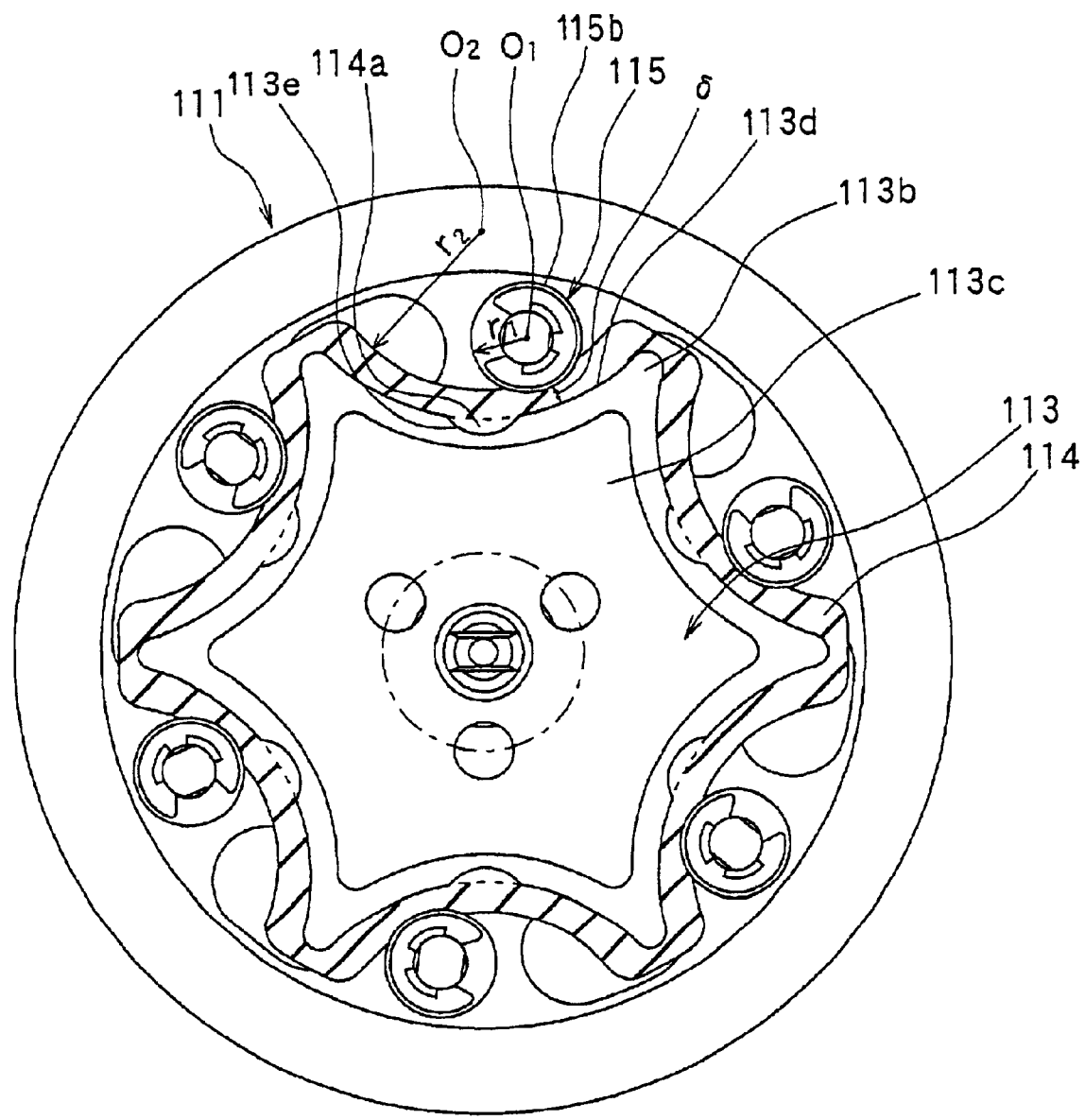
FIG. 14 is a front view showing the pulley at a relative rotational angle of 8° (fourth embodiment)

Here, FIG. 13 shows a state in which torque is not exerted on the pulley body 111 (the relative rotational angle θ of the pulley body 111 with respect to the center hub 113 is 0°). FIG. 14 shows a state in which torque is exerted on the pulley body 111 (the relative rotational angle θ is, for example, about 8°).

Figure 15:
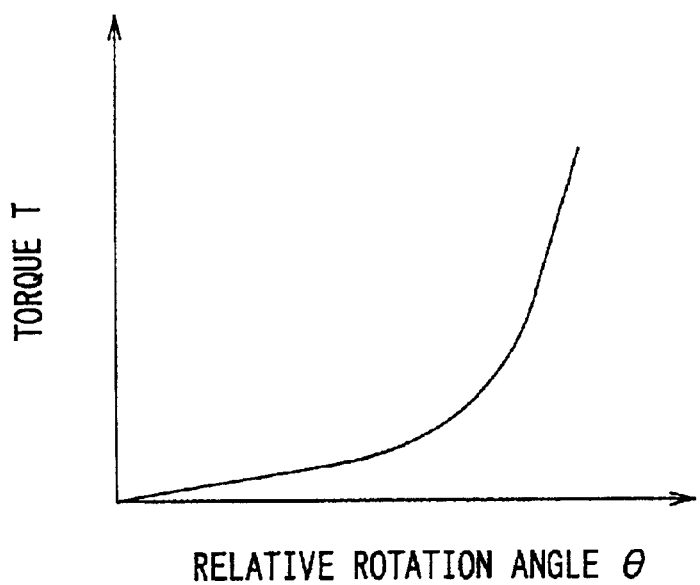
FIG. 15 is a graph showing a relation between the relative rotational angle θ of the pulley and transmission torque (fourth embodiment)

Thus, the change rate of the distance δ between both curved surfaces 115b and 113d detected when the relative rotational angle θ exceeds the predetermined value becomes larger than that detected when the relative rotational angle θ is not more than the predetermined amount. In this connection, since the rubbery damper 114 is disposed between both curved surfaces 115b and 113d, the amount of compressive deformation of the damper 114 increases non-linearly as the relative rotational angle θ becomes larger. That is, as shown in FIG. 15, the transmission torque transmitted from the pulley body 111 to the center hub 113 becomes larger non-linearly as the relative rotational angle θ becomes larger.

Therefore, even if a rubber having a relatively large elastic modulus is selected for the material of the damper 114, the amount of deflection at a relative rotational angle θ of not more than the predetermined value can be: made small and therefore rubber having a relatively large elastic modulus can be adopted for the damper 114.

Further, since it is possible to prevent the damper 114 from exceeding its elastic limit when the transfer torque becomes large, the transfer of a large torque can be done while absorbing a torque fluctuation sufficiently.

(Fifth Embodiment)

Figure 16:
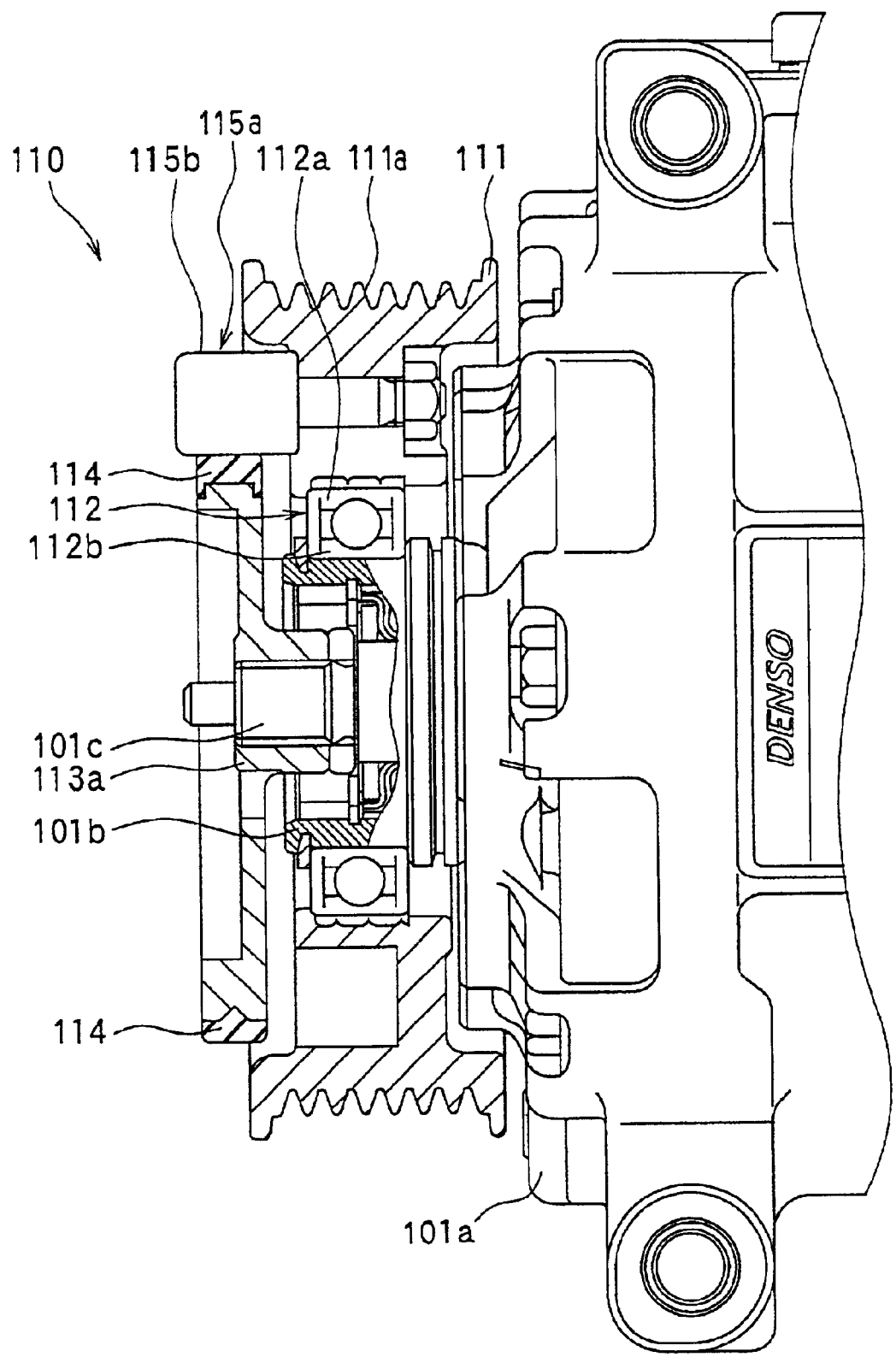
FIG. 16 is a cross-sectional view showing a pulley (fifth embodiment)
Figure 17:
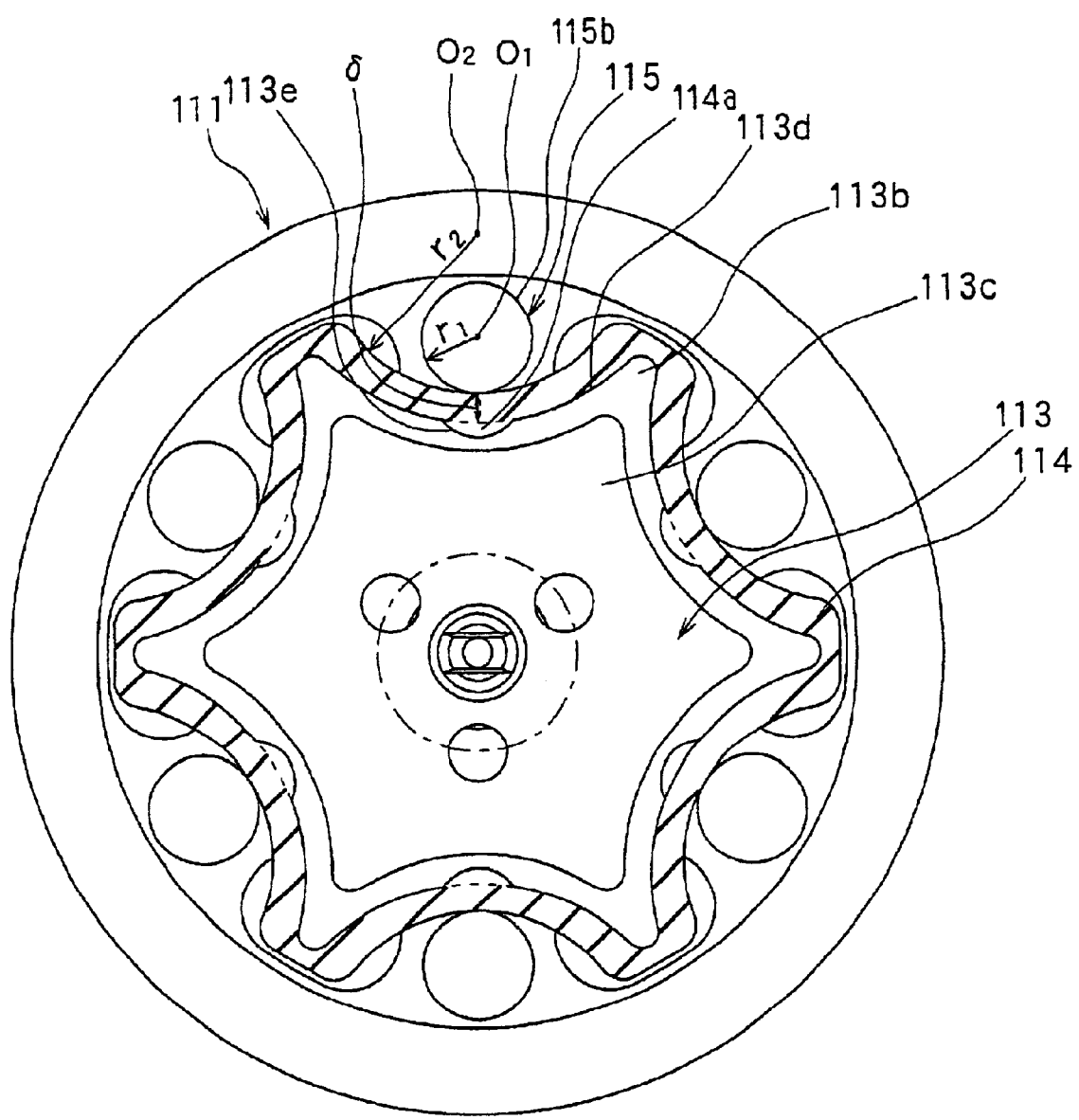
FIG. 17 is a front view showing a pulley body (fifth embodiment)

In the fourth embodiment, roller 115 which is rotating and the damper 114 are brought into contact with each other. However, in the present fifth embodiment, as shown in FIGS. 16 and 17, the roller 115 is omitted and instead an outer peripheral surface of a pin 115a is brought into contact with the damper 114. In the present fifth embodiment, the outer peripheral surface of the pin 115a corresponds to the first curved surface 115b.

Here, a film (e.g., Teflon sheet) having a small frictional coefficient is affixed to the surface of the damper 114 which comes into contact with the outer peripheral surface (the first curved surface 115b) of the pin 115a, thereby allowing the damper 114 and the outer peripheral surface (the first curved surface 115b) of the pin 115a to slide smoothly with respect to each other.

In the above-described fourth and fifth embodiments, the damper 114 is positioned between the first and second curved surfaces 115b and 113d by disposing the damper 114 on the second curved surface 113d. Alternatively, the damper 114 may be positioned between the first and second curved surfaces 115b and 113d by winding the damper 114 around the first curved surface 115b (the outer peripheral surface of the roller 115 or of the pin 115a).

In the above-described fourth and fifth embodiments, the damper 114 is made of rubber (EPDM). Alternatively, the damper 114 may be made of any other material such as, for example, resin or metal.

In the above-described fourth and fifth embodiments, the present invention is applied to the pulley type torque transmitting apparatus 10 for transmitting the torque to the compressor 101. Alternatively, the present invention may be applied to any other torque transmitting device.

In the above-described fourth and fifth embodiments, the roller 115 and the flange portion 113c are made of metal. Alternatively, the roller a15 and the flange portion 113c may be made of other material such as resin.

In the above-described fourth and fifth embodiments, the torque is transmitted from the pulley body 111 to the center hub 113. The present invention is also applicable to the case where torque is transmitted from the center hub 113 to the pulley body 111.

Further, the present invention is applicable to a pulley with torque limiter mechanism for preventing the transmission of an excessive torque caused by, for example, breakage of the flange portion 113c at a predetermined or larger value of the transmitting torque.

(Sixth Embodiment)

Figure 18:
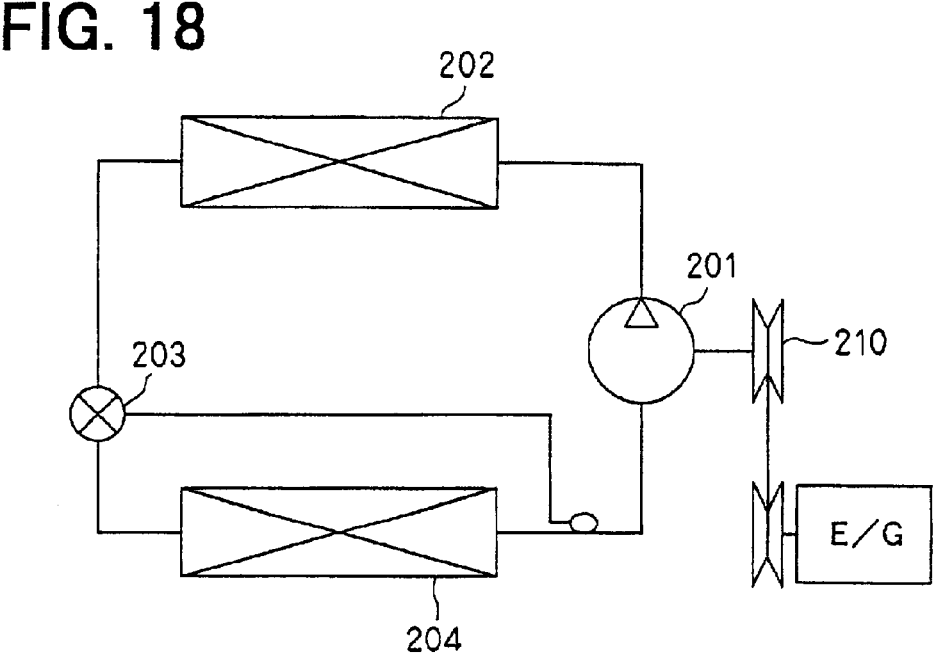
FIG. 18 is a schematic view showing a refrigeration cycle for a vehicle air conditioner (sixth embodiment)

In the sixth embodiment, the present invention is applied to a torque transmitting apparatus for the transmitting a power from a vehicle engine to a compressor for a vehicular air conditioner. FIG. 18 is a schematic view showing a refrigeration cycle for the vehicle air conditioner.

A compressor 201 sucks and compresses a refrigerant. A condenser 202 cools the refrigerant discharged from the compressor 201. A pressure reducing device 203 reduces the pressure of the refrigerant flowing out of the condenser 202. An evaporator 204 evaporates the refrigerant pressure-reduced by the pressure reducing device 203, thereby allowing the refrigerant to cool an air passing through the evaporator 204.

Here, in the present embodiment, as the pressure reducing device 203, a thermostatic expansion valve is used for adjusting an opening degree thereof so that the refrigerant at an outlet side of the evaporator 204 has, a predetermined superheat.

A pulley type torque transmitting apparatus 210 transmits a power of the engine E/G through a V belt (not illustrated) to the compressor 201. The pulley type torque transmitting apparatus 210 will be described.

Figure 19:
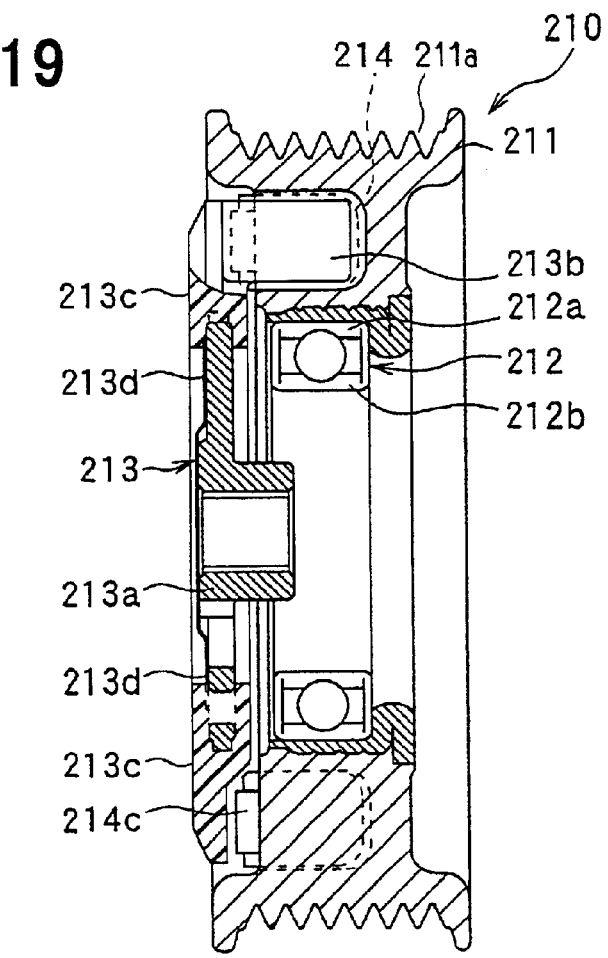
FIG. 19 is a cross-sectional view showing a pulley (sixth embodiment)

FIG. 19 is a cross-sectional view showing the pulley type torque transmitting apparatus 210. A metal pulley body 211 includes V grooves 211a for around which a V-belt is hung. The pulley body 211 receives the driving force from the engine E/G and rotates.

A radial bearing 212 supports the pulley body 211 rotatably. An outer race 212a of the radial bearing 212 is press-fitted and fixed into the pulley body 211 and a cylindrical portion formed in a front housing of the compressor 201 is inserted into an inner race 212b. Thus, a radial load induced by the tension of the V belt can be received by the front housing 201a of the compressor 201 without being received by: a shaft of the compressor 201.

A center hub 213 is connected to the shaft of the compressor 201 and rotates together with the shaft. The center hub. The center hub 213 includes a cylindrical portion 213a having a cylindrical inner peripheral surface which is formed with internal threads for coupling with external threads formed on an outer peripheral surface of the shaft, an annular portion 213c formed with plural projections 213b which receive torque fed from the pulley body 211, and a flange portion 213d which provides a mechanical connection between the annular portion 213c and the cylindrical portion 213a to transfer torque from the annular portion 213c to the cylindrical portion 213a.

The cylindrical portion 213a and the flange portion 213d are formed integrally by molding a metal, while the annular portion 213c is formed by molding a resin, the flange portion 213d and the annular portion 213c are integrally formed by insert molding.

Figure 20:
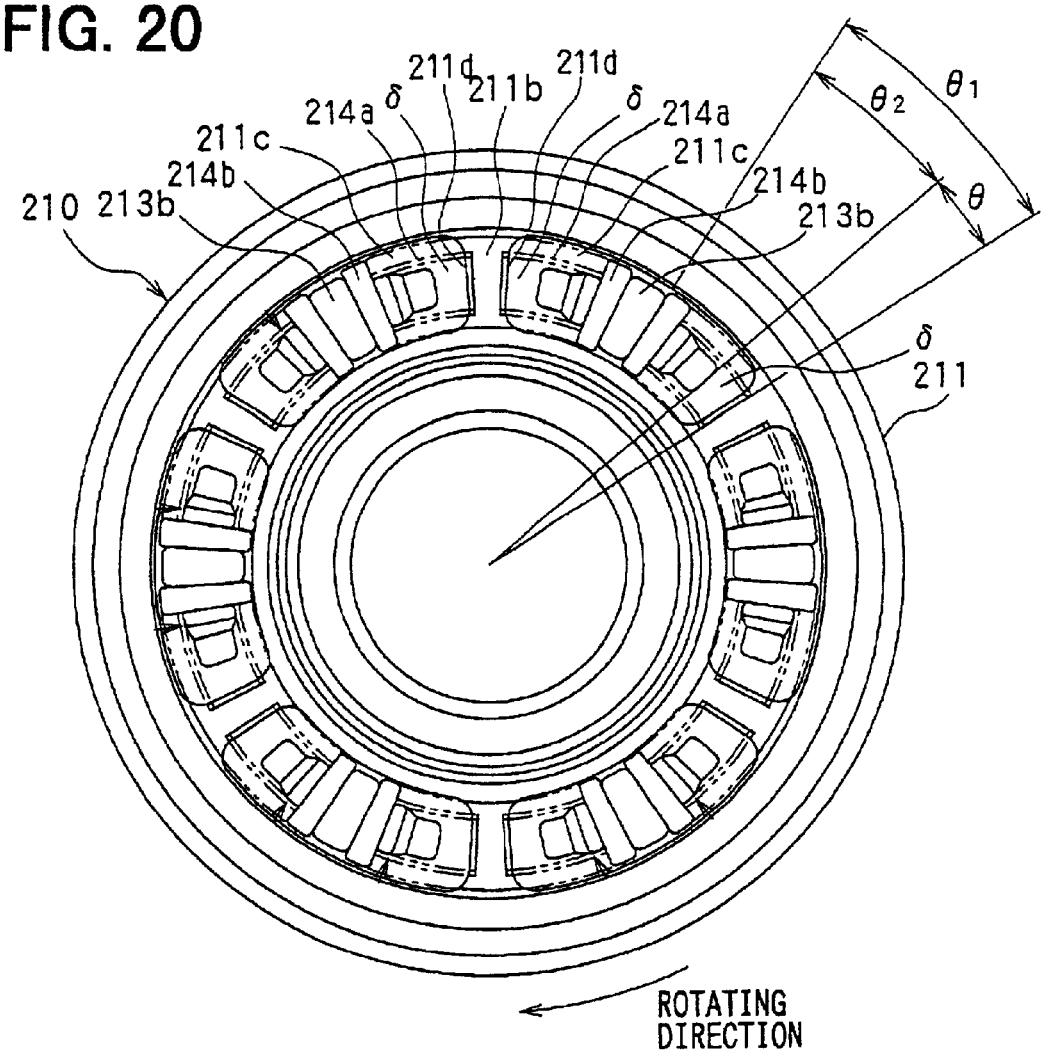
FIG. 20 is a front view showing a pulley body (sixth embodiment)

At the portion of the pulley body 211 corresponding to the annular portion 213c there are formed plural projections 211b integrally so as to project from the pulley body 211 toward the annular portion 213c, as shown in FIG. 20. With the pulley body 211 and the center hub 213 mounted to the compressor 201, the projections 213b of the center hub 213 and the projections 211b of the pulley body 211 are positioned alternately around the shaft in the circumferential direction.

In a generally box-shaped space 211c formed between both projections 211b and 213b is disposed a damper 214 to transmit the torque received by the pulley body 211 to the center hub 213. The damper 214 is constituted by accommodating within a single space 211c a coil spring 214a formed in a coil shape using a metal and a block-like rubber damper made of an elastically deformable material (EPDM (ethylene-propylene-diene terpolymer rubber)) which also serves as a spring seat for holding the coil spring 214a. The coil spring 214a and the rubber damper 214b will hereinafter be designated the first damper 214a and the second damper 214b, respectively.

The size θ1 of a portion of the first damper 214a generally parallel to a compressive load direction (circumferential direction) is larger than the size θ2 of a portion of the second damper 214b generally parallel to the compressive load direction, and in the state before compressive deformation of the second damper 214b, the inner wall 211d of the space 211c is spaced through a predetermined distance δ from the second damper 214b in the compressive load direction.

According to the sixth embodiment, before compressive deformation of the second damper 214b, an inner wall 211d of the space 211c is spaced through a predetermined gap δ from the second damper 214b in the compressive load direction, so when torque is imposed on the pulley body 211 and the pulley body rotates relatively with respect to the center hub 213, the transfer of torque is performed mainly by a compressive deformation of the first damper 214a until a relative rotational angle α thereof reaches a predetermined relative rotational angle α1.

When the first damper 214a is compressively deformed a predetermined amount or more and the relative rotational angle a reaches the predetermined relative rotational angle α1, both first and second dampers 214a, 214b are deformed compressively and share the compressive load to transmit the torque.

Thus, the relation between the relative rotation angle α and the torque transmitted from the pulley body 211 to the center hub 213 has a non-linear characteristic such that a compressive deformation rate k of the damper 214 increases with the instant of collapse of the gap δ (arrival of the relative rotational angle α at the relative rotational angle α1) as a turning point.

That is, before collapse of the gap δ, the compressive deformation rate k of the damper 214 is almost equal to the compressive deformation rate k1 of the first damper 214a alone.

While after collapse of the gap δ, the compressive deformation rate k of the damper 214 becomes a parallel sum (k=k1+k2) of the compressive deformation rate k1 of the first damper 214a alone and the compressive deformation rate k2 of the second damper 214b alone.

The compressive deformation rate k means a change rate (ΔT/Δα) of the transmission torques T with respect to the relative is rotational angle α. The transfer torque T with respect to the relative rotational angle α increases as the compressive deformation rate increases.

Figure 21:
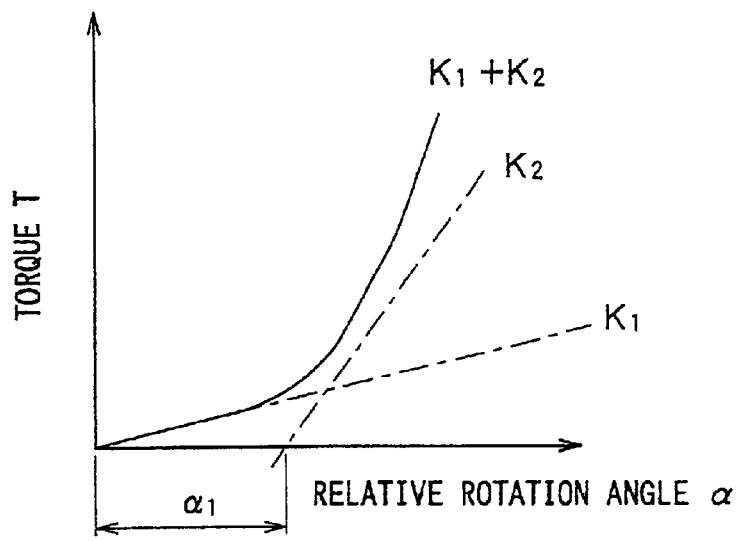
FIG. 21 is a graph showing characteristics of dampers (sixth embodiment)

In FIG. 21, a dot-dash line indicates the compressive deformation rate k1 of the first damper 214a alone and a dash-double dot line indicates the compressive deformation rate k2 of the second damper 214b alone. In the sixth embodiment, the compressive deformation rate k1 is smaller than the compressive deformation rate k2.

According to the sixth embodiment, therefore, even if a large torque acts on the pulley type torque transmitting apparatus 210, it is possible to prevent the damper 214 from exceeding its elastic limit and hence it is possible to absorb a torque variation sufficiently under the transfer of a large torque.

In the above-described sixth embodiment, the second damper 214b is made of rubber (EPDM). Alternatively, the second damper 214b may be made of any other material, e.g., elastomer, resin, or metal.

In the above-described sixth embodiment, a metallic coil spring is used as the first damper 214a. Alternatively, other shape and material may be adopted.

In the above-described sixth embodiment, the present invention is applied to the pulley type torque transmitting apparatus 210 which transmits the torque to the compressor 201. Alternatively, the present invention may be applied to any other torque transmitting device.

In the above-described sixth embodiment, the compressive deformation rates k1 and k2 are set different from each other so that the former is smaller than the latter. Alternatively, the compressive deformation rates k1 and k2 may be made equal to each other, or the former may be set larger than the latter.

In the above-described sixth embodiment, the second damper 214b serves also as a spring seat for holding the first damper 214a. Alternatively, a dedicated spring seat may be provided and the second damper 214b may be used as a dedicated member for absorbing a torque variation.

(Seventh Embodiment)

Figure 22:
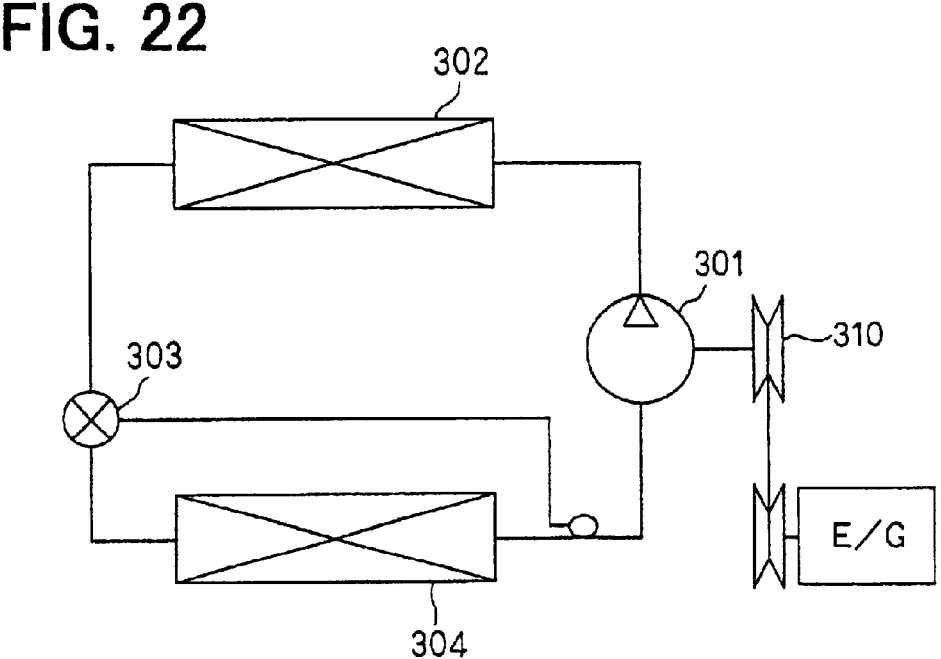
FIG. 22 is a schematic view showing a refrigeration cycle for a vehicle air conditioner (seventh embodiment)

In the seventh embodiment, the present invention is applied to a torque transmitting apparatus for the transmitting a power from a vehicle engine to a compressor for a vehicular air conditioner. FIG. 22 is a schematic view showing a refrigeration cycle for the vehicle air conditioner.

A compressor 301 sucks and compresses a refrigerant. A condenser 302 cools the refrigerant discharged from the compressor 301. A pressure reducing device 303 reduces the pressure of the refrigerant flowing out of the condenser 302. An evaporator 304 evaporates the refrigerant pressure-reduced by the pressure reducing device 303, thereby allowing the refrigerant to cool an air passing through the evaporator 304.

Here, in the present seventh embodiment, as the pressure reducing device 303, a thermostatic expansion valve is used for adjusting an opening degree thereof so that the refrigerant at an outlet side of the evaporator 304 has a predetermined superheat.

A pulley type torque transmitting apparatus 310 transmits a power of the engine E/G through a V belt (not illustrated) to the compressor 301. The pulley type torque transmitting apparatus 310 will be described.

Figure 23:
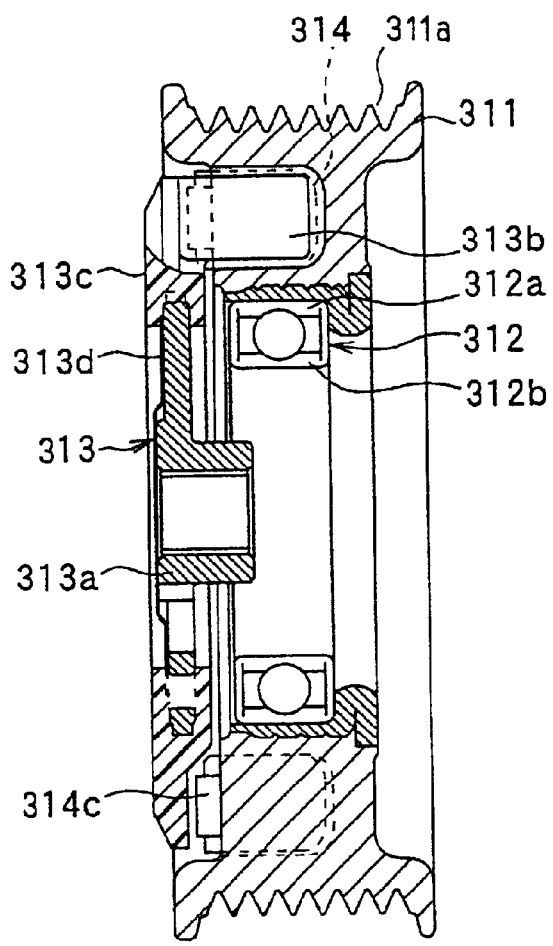
FIG. 23 is a cross-sectional view showing a pulley (seventh embodiment)

FIG. 23 is a cross-sectional view showing the pulley type torque transmitting apparatus. 310. A metal pulley body 311 includes V grooves 311a for around which a V-belt is hung. The pulley body 311 receives the driving force from the engine E/G and rotates.

A radial bearing 312 supports the pulley body 311 rotatably. An outer race 312a of the radial bearing 312 is press-fitted and fixed into the pulley body 311 and a cylindrical portion formed in a front housing of the compressor 301 is inserted into an inner race 312b. Thus, a radial load induced by the tension of the V belt can be received by the front housing of the compressor 301 without being received by a shaft of the compressor 301.

A center hub 313 is connected to the shaft of the compressor 201 and rotates together with the shaft. The center hub 313 includes a cylindrical portion 313a having a cylindrical inner peripheral surface which is formed with internal threads for coupling with external threads formed on an outer peripheral surface of the shaft, an annular portion 313c formed with plural projections 313b which receive torque fed from the pulley body 311, and a flange portion 313d which provides a mechanical connection between the annular portion 313c and the cylindrical portion 313a to transfer torque from the annular portion 313c to the cylindrical portion 313a.

The cylindrical portion 313a and the flange portion 313d are formed integrally by molding a metal, while the annular portion 313c is formed by molding a resin, the flange portion 313d and the annular portion 313c are integrally formed by insert molding.

Figure 24:
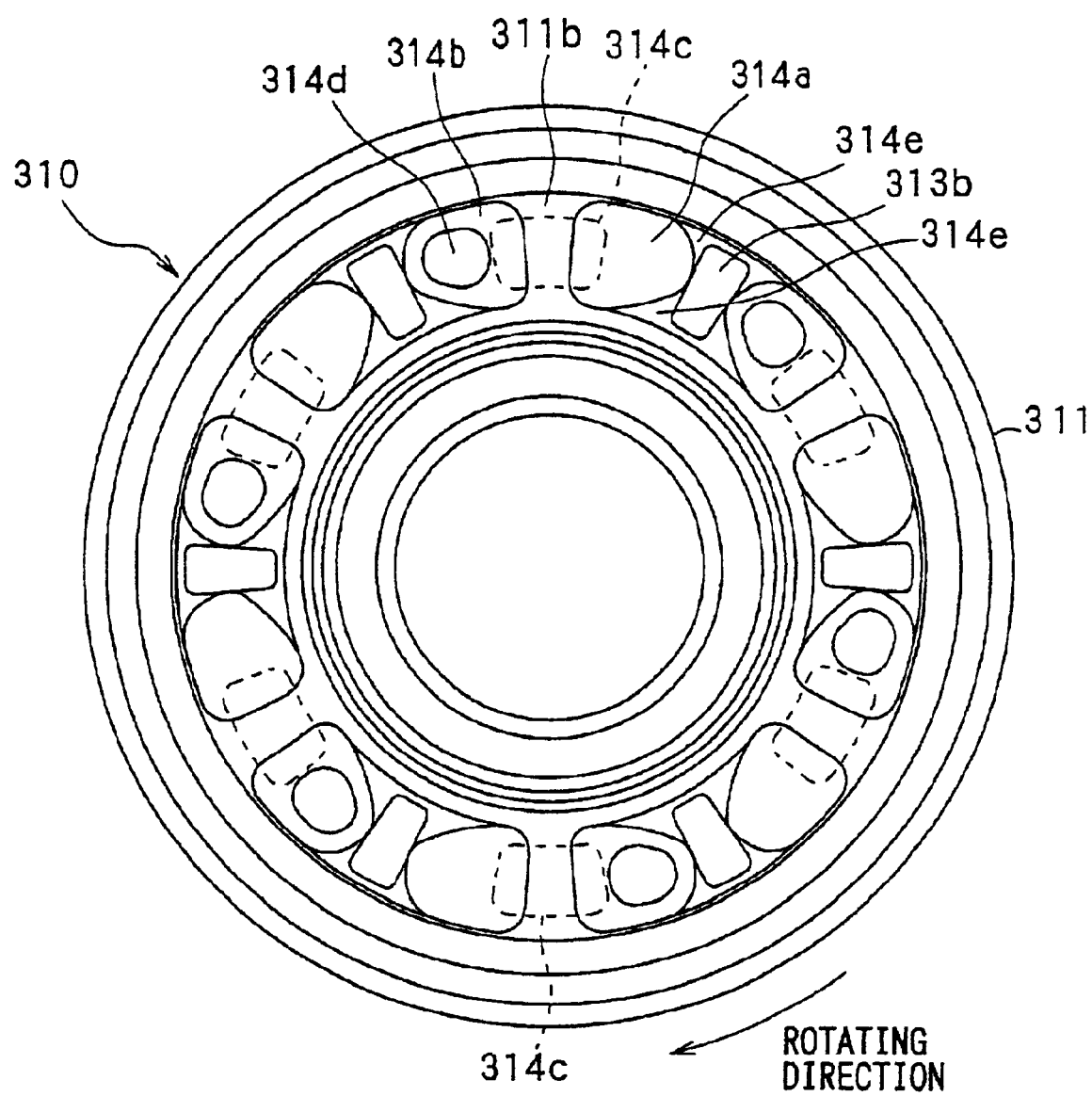
FIG. 24 is a front view showing a pulley body (seventh embodiment)

At the portion of the pulley body 311 corresponding to the annular portion 313c there are formed plural projections 311b integrally so as to project from the pulley body 311 toward the annular portion 313c, as shown in FIG. 24. With the pulley body 311 and the center hub 313 mounted to the compressor 301, the projections 313b of the center hub 313 and the projections 311b of the pulley body 311 are positioned alternately around the shaft in the circumferential direction.

A damper 314 to transmit the torque received by the pulley body 311 to the center hub 313 is disposed between both projections 311b and 313b. The damper 14 is made of an elastically deformable material (EPDM (ethylene-propylene-diene terpolymer rubber).

The damper 314 includes a first deforming portion 314a which, when the pulley body 311 for driving the compressor 301 rotates in a direction ("forward direction (arrow direction)" hereinafter) of rotating relatively with respect to the center hub 313, transmits a torque from the projections 311b of the pulley body 311 to the projections 313b of the center hub 313 while being deformed compressively under a compressive load, and a second deforming portion 314b which, when the pulley body 311 rotates in a direction ("reverse direction" hereinafter) reverse to the forward direction relatively with respect to the center hub 313, is deformed compressively under a compressive load. The first and second deforming portions 314a, 314b as one set are connected together through a connecting member 314c. Plural such sets of deforming portions, each set being connected through the connecting member 314c, are arranged in the circumferential direction.

In the second deforming portion 314b, a hole 314d is formed for reducing an area of a cross-section nearly perpendicular to the compressive load direction so that an elastic modulus k2 (the absolute value thereof) of the second deforming portion 314b with the compressor 301 OFF becomes smaller than an elastic modulus k2 of the first deforming portion 314a with the compressor 301 ON.

The elastic modulus k1 and the elastic modulus k2 of the first and second deforming portions 314a, 314b represent a change rate K of transfer torque T transferred between the pulley body 311 and the center hub 313 with respect to a relative rotational angle θ of the pulley body 311 relative to the center hub 313.

Figure 25:
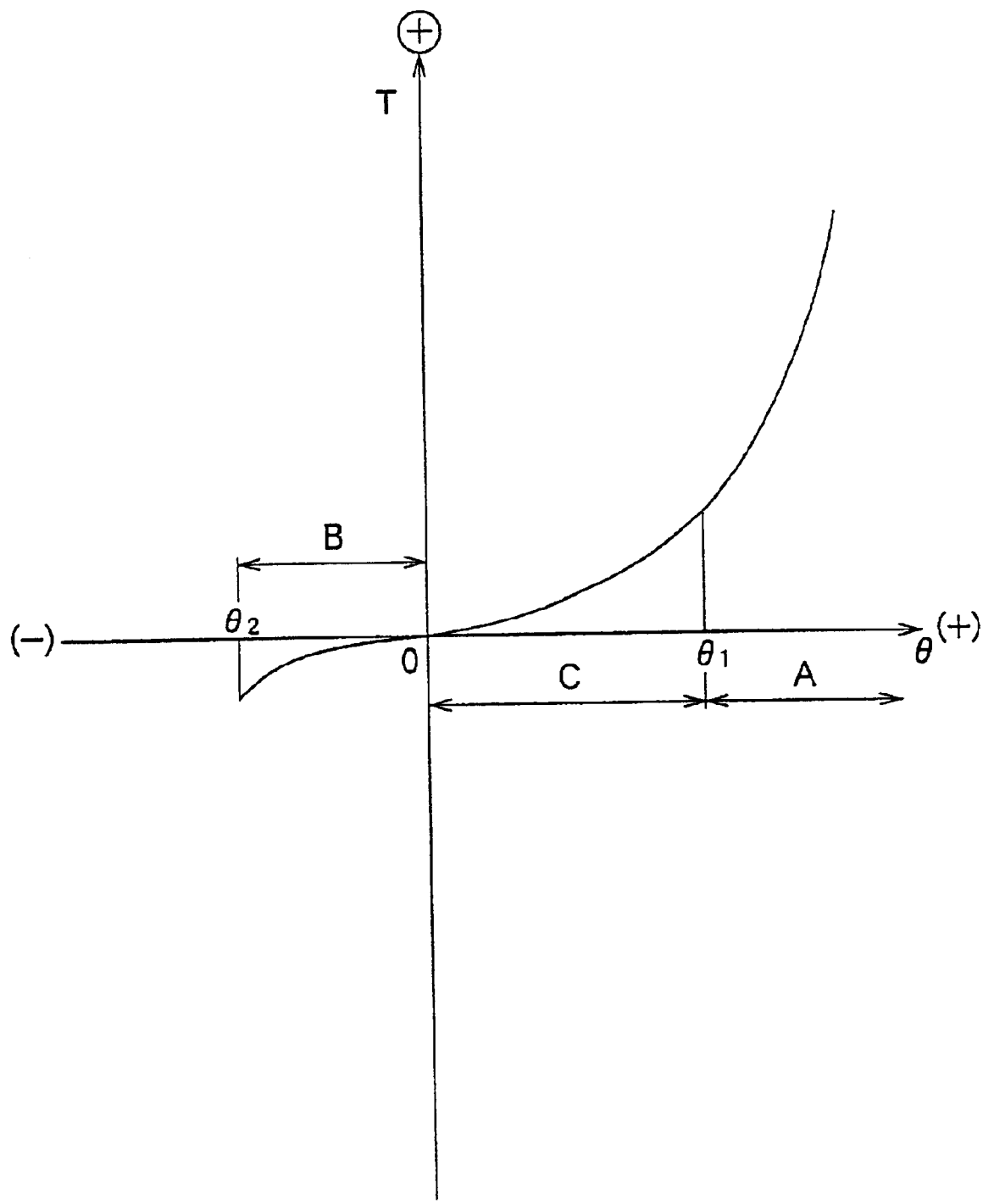
FIG. 25 is a characteristic diagram showing characteristics of a damper (seventh embodiment)

The first deforming portion 314a is formed in a generally triangular shape so as to be reduced in sectional area in the forward direction, allowing a gap 314e to be formed on the forward direction side around the first deforming portion 314a which gap 314e becomes smaller in size in the reverse direction, thereby affording a non-linear characteristic of the elastic modulus k1 of the first deforming portion 314a such that the larger the relative rotational angle θ in the forward direction, the larger the elastic modulus k1, as shown in FIG. 25.

It is not necessary that the first elastic modulus k1 be always larger than the second elastic modulus k2. It suffices if at least the first elastic modulus k1 at a relative rotational angle θ of not less than a first predetermined angle θ1 (region A in FIG. 25) in the forward direction is larger than the second elastic modulus k2 in a region (region B in FIG. 25) in which the relative rotational angle θ in terms of the absolute value is not more than a second predetermined angle θ2 smaller than the first predetermined angle θ1 in the reverse direction. More specifically, it suffices if the absolute value of the first elastic modulus k1 in region A is larger than the absolute value of the second elastic modulus k2 in region B.

Since in the seventh embodiment the first deforming portion 314a has a non-linear characteristic, the elastic modulus k1 of the first deforming portion 314a in region C is almost equal to the absolute value of the second elastic modulus k2 in region B.

The first predetermined angle θ1 corresponds to a lower-limit value of the relative rotational angle θ with the compressor 301 ON, while the first predetermined value θ2 corresponds to a upper-limit value of the absolute value of the relative rotational angle θ with the compressor 301 OFF.

According to the seventh embodiment, since the elastic modulus K is set so as to become larger in the region where the relative rotational angle θ is not less than the first predetermined angle θ1 than in the region where the relative rotational angle θ is not more than the second predetermined angle θ2, even if the required torque which the compressor 301 requires becomes large with operation of the compressor, it is possible to transfer a large torque and absorb a torque variation to a satisfactory extent while preventing the damper 314 from exceeding its elastic limit.

On the other hand, when the discharge capacity decreases and the required torque becomes: small, a torque variation can be absorbed by the second deforming portion 314b which is small in elastic modulus K. Thus, even when the required torque is small, it is possible to absorb the required torque to a satisfactory extent.

According to the seventh embodiment, as set forth above, it is possible to transfer a large torque while absorbing a torque variation sufficiently.

In the seventh embodiment, both first and second deforming portions 314a, 314b possess a non-linear characteristic. Alternatively, both or only one of the first and second deforming portions 314a, 314b may possess a linear characteristic.

The shapes of the first and second deforming portions 314a, 314b are not limited to those shown in FIG. 24. For example, as shown in FIG. 26, circumferential sizes L1, L2 of the first and second deforming portions 314a, 314b, respectively, may be made different from each other.

Figure 26:
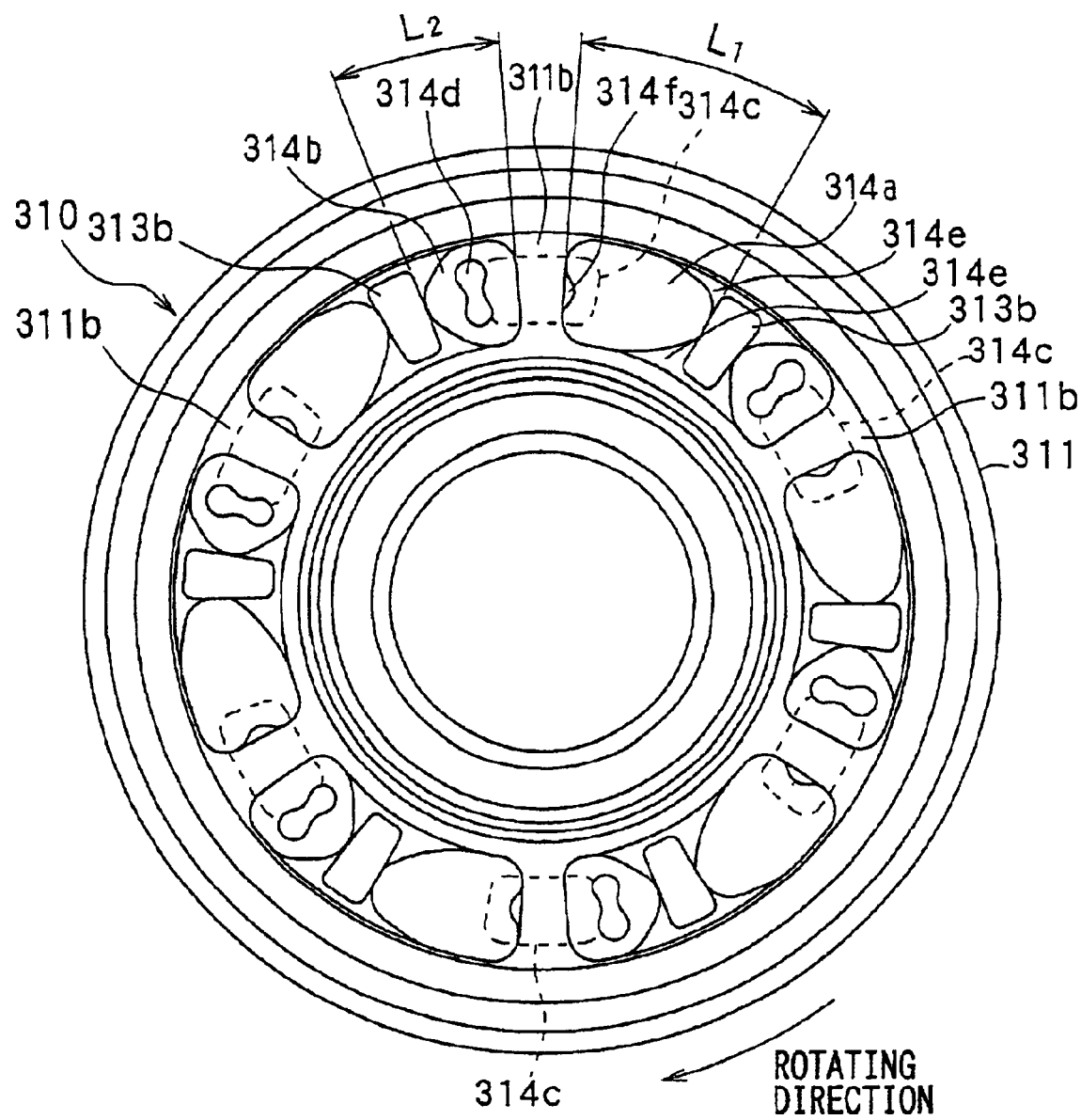
FIG. 26 is a front view showing a modified example of the pulley body (seventh embodiment)

In FIG. 26, the size L1 is set larger than the size L2 and a recess 314f, which is concave inwards of the first deforming portion 314a, is formed in an end portion of the first deforming portion located on the side opposite to the compressing direction, to afford a non-linear characteristic such that the elastic modulus k1 in region C is as small as possible.

(Eighth Embodiment)

Figure 27B:
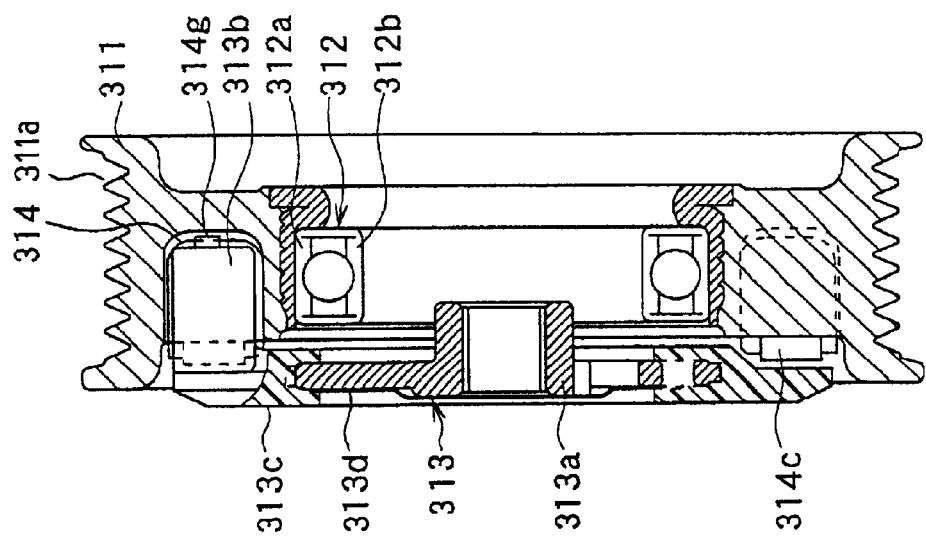
FIG. 27B is a cross-sectional view showing the pulley body (eighth embodiment)
Figure 27A:
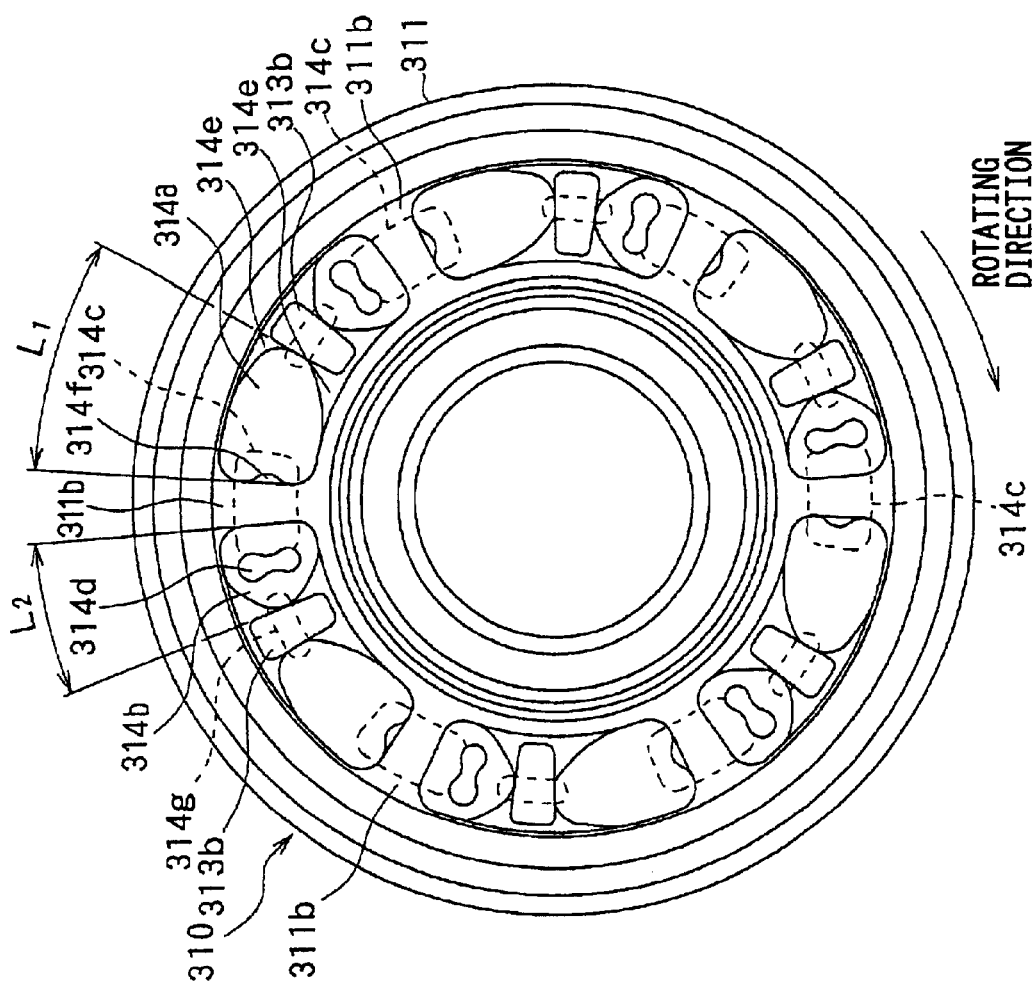
FIG. 27A is a front view showing a pulley body (eighth embodiment)

In the eighth embodiment, as shown in FIGS. 27A and 27B, the first and second deforming portions 314a, 314b are connected through a connecting member 314g, thereby allowing the damper 314 to be installed in the pulley type torque transmitting apparatus 310 easily.

In the eighth embodiment, the first and second deforming portions 314a, 314b and the connecting member 314g are formed integrally by molding. Alternatively, both deforming portions 314a, 314b and the connecting member 314g may be formed separately and then connected together by a bonding method such as adhesion by vulcanization.

In the above-described seventh and eighth embodiments, the damper 314 is made of rubber (EPDM). The damper 314 may be formed using any other material, e.g., elastomer, resin, or metal.

In the above-described seventh and eighth embodiments, the present invention is applied to the-pulley type torque transmitting apparatus 310 which transmits torque to the compressor 301. Alternatively, the present invention may be applied to any other torque transmitting device.

In the above-described seventh and eighth embodiments, the hole 314a is a through hole. Alternatively, the hole 314a may be a recess or the like which is not a through hole.

In the above-described seventh and eighth embodiments, the hole 314a is formed in the second deforming portion 314b. Alternatively, the circumferential size L2 of the second deforming portion 314b may be enlarged or the material of the second deforming portion may be changed to make the second elastic modulus k2 small.

(Ninth Embodiment)

Figure 28:
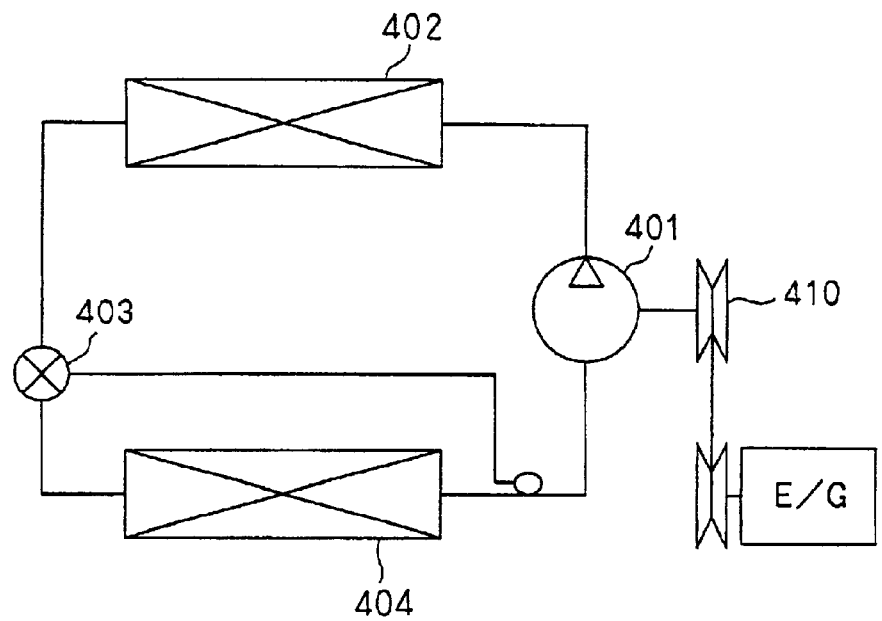
FIG. 28 is a schematic view showing a refrigeration cycle for a vehicle air conditioner (ninth embodiment)

In the ninth embodiment, the present invention is applied to a torque transmitting apparatus for the transmitting a power from a vehicle engine to a compressor for a vehicular air conditioner. FIG. 28 is a schematic view showing a refrigeration cycle for the vehicle air conditioner.

A compressor 401 sucks and compresses a refrigerant. A condenser 402 cools the refrigerant discharged from the compressor 401. A pressure reducing device 403 reduces the pressure of the refrigerant flowing out of the condenser 402. An evaporator 404 evaporates the refrigerant pressure-reduced by the pressure reducing device 403, thereby allowing the refrigerant to cool an air passing through the evaporator 404.

Here, in the present seventh embodiment, as the pressure reducing device 403, a thermostatic expansion valve is used for adjusting an opening degree thereof so that the refrigerant at an outlet side of the evaporator 404 has a predetermined superheat.

A pulley type torque transmitting apparatus 410 transmits a power of the engine E/G through a v belt (not illustrated) to the compressor 401. The pulley type torque transmitting apparatus 410 will be described.

Figure 29:
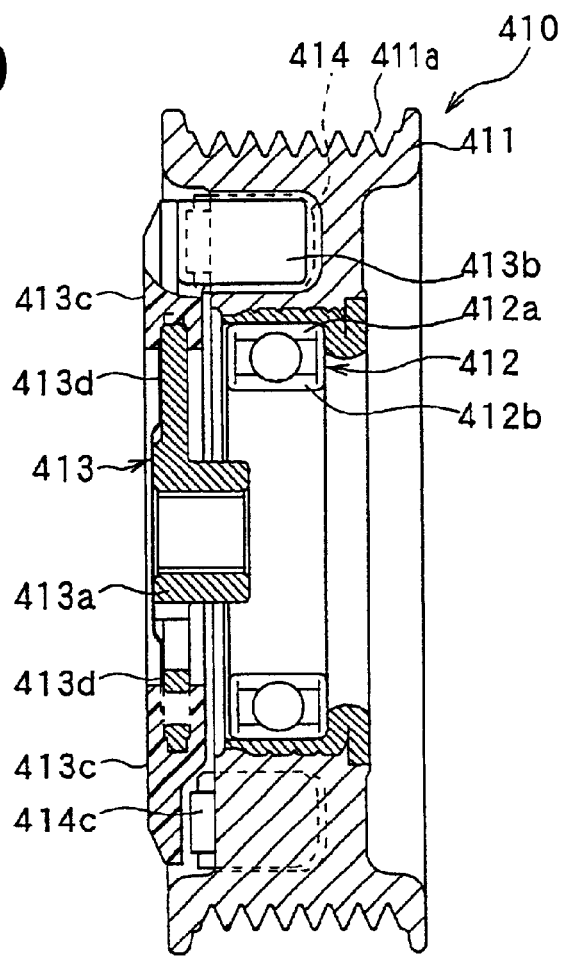
FIG. 29 is a cross-sectional view showing a pulley (ninth embodiment)

FIG. 29 is a cross-sectional view showing the pulley type torque transmitting apparatus 410. A metal pulley body 411 includes V grooves 411a for around which a V-belt is hung. The pulley body 411 receives the driving force from the engine E/G and rotates.

A radial bearing 412 supports the pulley body 411 rotatably. An outer race 412a of the radial bearing 412 is press-fitted and fixed into the pulley body 411 and a cylindrical portion formed in a front housing of the compressor 401 is inserted into an inner race 412b. Thus, a radial load induced by the tension of the V belt can be received by the front housing of the compressor 401 without being received by a shaft of the compressor 401.

A center hub 413 is connected to the shaft of the compressor 401 and rotates together with the shaft. The center hub 413 includes a cylindrical portion 413a having a cylindrical inner peripheral surface which is formed with internal threads for coupling with external threads formed on an outer peripheral surface of the shaft, an annular portion 413c formed with plural projections 413b which receive torque fed from the pulley body 411, and a flange portion 413d which provides a mechanical connection between the annular portion 413c and the cylindrical portion 413a to transfer torque from the annular portion 413c to the cylindrical portion 413a.

The cylindrical portion 413a and the flange portion 413d are formed integrally by molding a metal, while the annular portion 413c is formed by molding a resin, the flange portion 413d and the annular portion 413c are integrally formed by insert molding.

Figure 30:
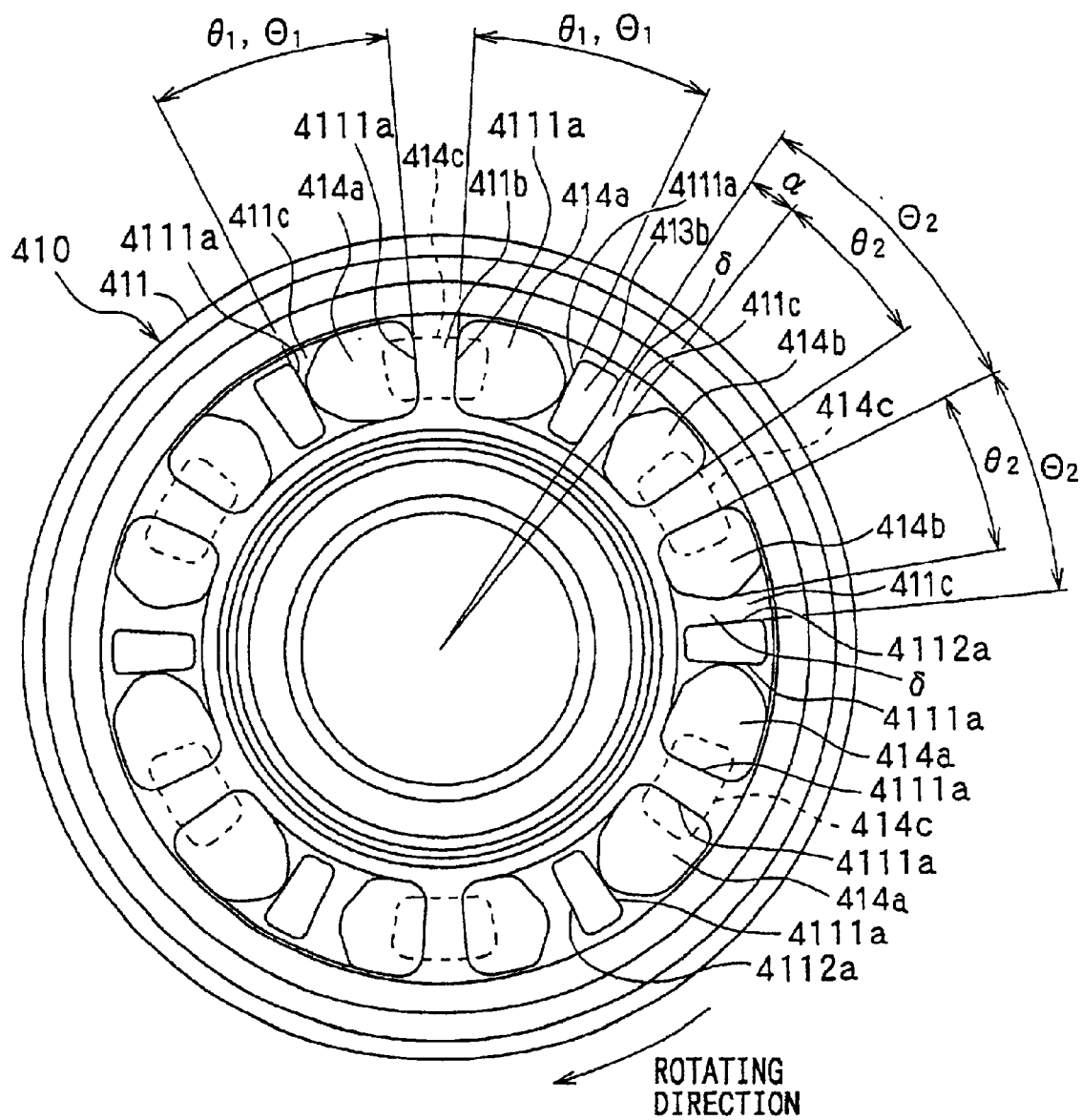
FIG. 30 is a front view showing a pulley body (ninth embodiment)

At the portion of the pulley body 411 corresponding to the annular portion 413c there are formed plural projections 411b integrally so as to project from the pulley body 411 toward the annular portion 413c, as shown in FIG. 30. With the pulley body 411 and the center hub 413 mounted to the compressor 401, the projections 413b of the center hub 413 and the projections 411b of the pulley body 411 are positioned alternately around the shaft in the circumferential direction.

In a box-shaped space 411c formed between both projections 411b and 413b, a damper 414 is disposed to transmit the torque received by the pulley body 411 to the center hub 413. The damper 414 is made of an elastically deformable material (EPDM (ethylene-propylene-diene terpolymer rubber)).

The damper 414 includes a first damper 414a and a second damper 414b having respective portions nearly parallel to the circumferential direction and different in respective sizes θ1, θ2 (θ1>θ2). The first and second dampers 414a, 414b as one set are arranged plural sets in the circumferential direction. In the ninth embodiment, the circumferential size θ1 of the first damper 414a is larger than the circumferential size θ2 of the second damper 414b.

In the ninth embodiment, in connection with the space 411c, the circumferential size Θ1 of the space ("the first space 4111" hereinafter) in which the first damper 414a is accommodated and the circumferential size Θ2 of the space ("the second space 4112" hereinafter) in which the second damper 414b is accommodated, are set equal to each other. Prior to compressive deformation of the second damper 414b, an inner wall 4112a of the second space 4112 is spaced through a predetermined gap δ from the second damper 414b in a compressive load direction (circumferential direction).

On the other hand, the first damper 414a is in contact with an inner wall 4111a of the first space 4112 in the compressive load direction (circumferential direction) already before compressive deformation of the second damper 414b.

A connecting member 414c connects two first dampers 414a and also two second dampers 414b.

According to the ninth embodiment, before compressive deformation of the second damper 414b, the inner wall 4112a of the second space 4112 is spaced through a predetermined gap δ from the second damper 414b in the compressive load direction. When torque is imposed on the pulley body 411 and the pulley body rotates relatively with respect to the center hub 413, the first damper 414a alone undergoes a compressive deformation until a relative rotational angle α thereof reaches a predetermined relative rotational angle α1.

When the first damper 414a is compressively deformed a predetermined amount or more and the relative rotational angle α reaches the predetermined relative rotational angle α1, the compressive load is exerted also on the second damper 414b and both first and second dampers 414a, 414b are deformed compressively.

Thus, the relation between the relative rotation angle α and the torque transferred from the pulley body 411 to the center hub 413 has a non-linear characteristic such that a compressive deformation rate k of the damper 414 combining first and second dampers 414a, 414b as the relative rotational angle α becomes larger. The compressive deformation rate k means a change rate (ΔT/Δα) of the transmission torque T with respect to the relative rotational angle α.

Figure 31:
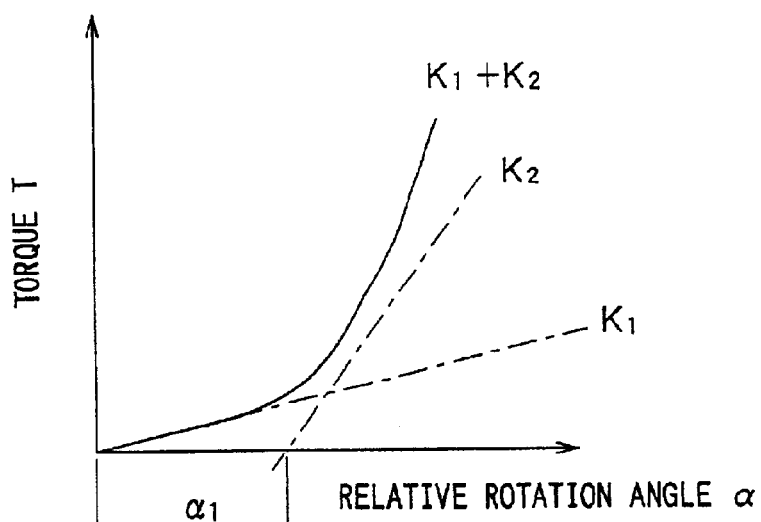
FIG. 31 is a graph showing characteristics of a damper (ninth embodiment)

In FIG. 31, a dot-dash line represents a compressive deformation rate k2 of the second damper 414b alone. In the ninth embodiment, since the size in the circumferential direction the θ1 of the first damper 414a is larger than that θ2 of the second damper 414b, the compressive deformation rate k1 is smaller than the compressive deformation rate k2.

Therefore, according to the ninth embodiment, even if a large torque is imposed on the pulley type torque transmitting apparatus 410, it is possible to prevent the damper 414 from exceeding its elastic limit and hence possible to absorb a torque variation sufficiently under the transfer of a large torque.

(Tenth Embodiment)

Figure 32:
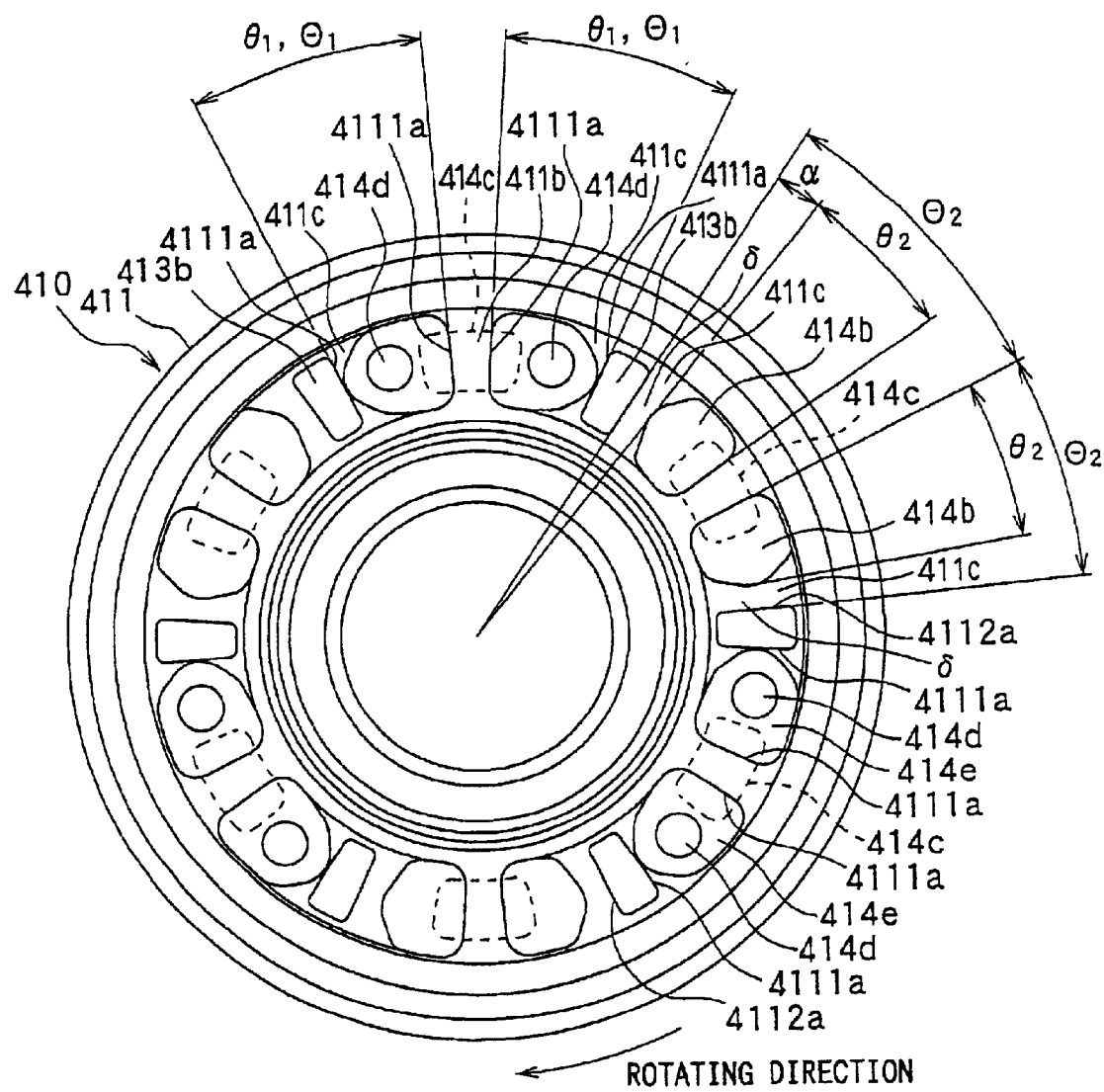
FIG. 32 is a front view showing a pulley body (tenth embodiment)

In the tenth embodiment, as shown in FIG. 32, the first and second dampers 414a, 414b are each formed with a hole 414d which is reduced in cross-sectional area of a section nearly perpendicular to the compressive load direction so that the compressive deformation rate k1 of the first damper 414a alone and the compressive deformation rate k2 of the second damper 414b alone have a non-linear characteristic.

More particularly, with the hole 414d formed in the damper, when a compressive load acts on the damper 414, causing the damper to be deformed compressively, and when the amount of the compressive deformation is small, the hole 414d collapses so that pillar portions 414e of the hole 414d which are nearly parallel to the compressive load direction undergoes a buckling deformation. Upon collapse of the hole 414d, the damper 414 is simply deformed compressively in the compressive load direction.

In this case, the buckling deformation proceeds under a small compressive load in comparison with the simple compressive deformation, so that the compressive deformation rate k after collapse of the hole 414d becomes large in comparison with that before collapse of the hole 414d, thus affording a non-linear characteristic even in the case of the first and second dampers 414a, 414b each alone.

(Eleventh Embodiment)

In the above-described ninth and tenth embodiments the size θ1 in the circumferential direction of the first damper 414a is set larger than that θ2 of the second damper 414b, and the size Θ1 in the circumferential direction of the first space 4111 and that Θ2 of the second space 4112 are made equal to each other. Before compressive deformation of the second damper 414b, the inner wall 4112a of the second space 4112 is spaced a predetermined gap δ from the second damper 414b in the compressive load direction. But in this eleventh embodiment, there is adopted a dimensional relation reverse thereto.

Figure 33:
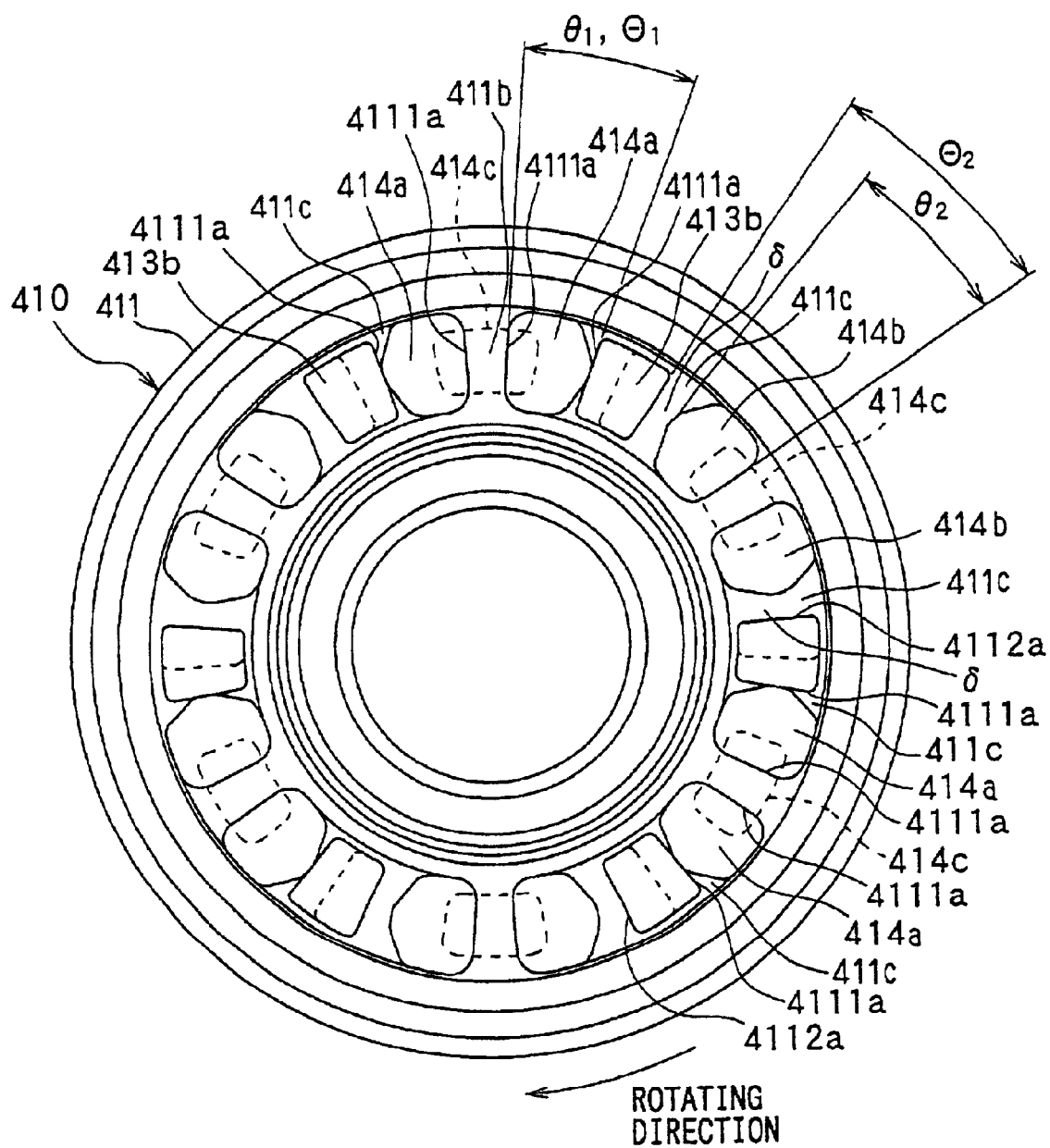
FIG. 33 is a front view showing a pulley body (eleventh embodiment)

More specifically, as shown in FIG. 33, the size θ1 in the circumferential direction of the first damper 414a and that θ2 of the second damper are made equal to each other, and the size Θ2 in the circumferential direction of the second space 4112 is set larger than that Θ1 of the first space 4111. Before compressive deformation of the second damper 414b, the inner wall 4112a of the second space 4112 is spaced through a predetermined gap δ from the second damper 414b in the compressive load direction.

In the eleventh embodiment, since the size θ1 in the circumferential direction of the first damper 414a and that θ2 of the second damper are made equal to each other, the compressive deformation rates k1 and k2 of the first and second dampers 414a, 414b are equal to each other.

(Twelfth Embodiment)

Figure 34:
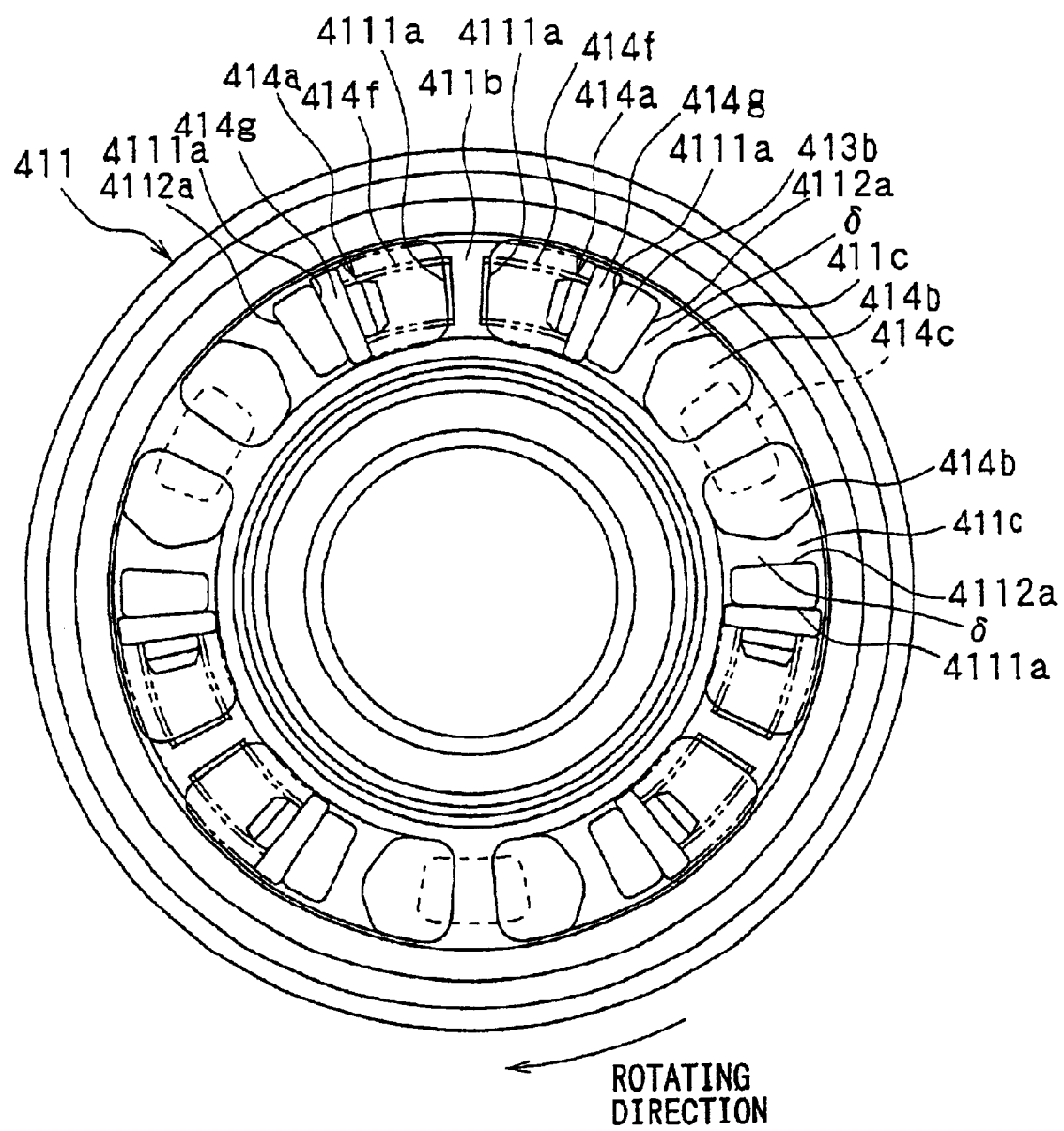
FIG. 34 is a front view showing a pulley body (twelfth embodiment)

In the above-described ninth through eleventh embodiments, the first and second dampers 414a, 414b are made of rubber. While in the present twelfth embodiment, the first damper 414a is constituted by a metallic coil spring 414f, as shown in FIG. 34. In the same figure, a spring seat 414g allows the coil spring 414f to seat well.

In the above-described ninth through twelfth embodiments, the damper 414 is made of rubber (EPDM). Alternatively, the damper 414 may be made of any other material, e.g., elastomer, resin, or metal.

In the above-described ninth through twelfth embodiments, the present invention is applied to the pulley type torque transmitting apparatus 410 which transmits torque to the compressor 401. Alternatively, the present invention may be applied to any other torque transmitting device.

In the above-described ninth through twelfth embodiments, the hole 414d is a through hole. Alternatively, the hole 414d may be a recess or the like which is not a through hole.

In the above-described ninth through twelfth embodiments, the damper 414 is composed of two dampers 414a and 414b. Alternatively, the damper 414 may be composed of three dampers.

(Thirteenth Embodiment)

Figure 35:
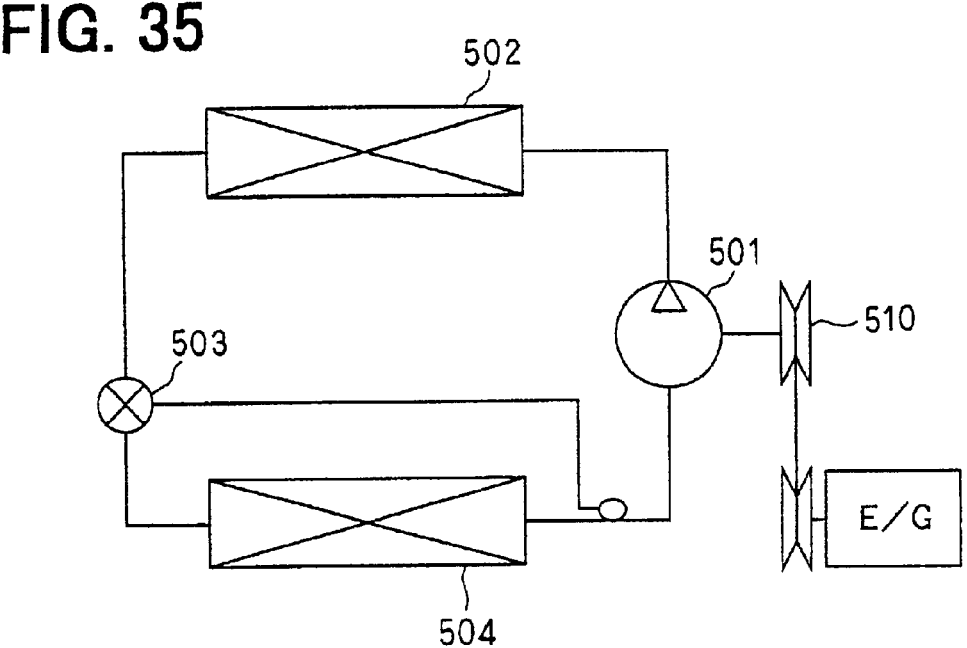
FIG. 35 is a schematic view showing a refrigeration cycle for a vehicle air conditioner (thirteenth embodiment)

In the thirteenth embodiment, the present invention is applied to a torque transmitting apparatus for the transmitting a power from a vehicle engine to a compressor for a vehicular air conditioner. FIG. 35 is a schematic view showing a refrigeration cycle for the vehicle air conditioner.

A compressor 501 sucks and compresses a refrigerant. A condenser 502 cools the refrigerant discharged from the compressor 501. A pressure reducing device 503 reduces the pressure of the refrigerant flowing out of the condenser 502. An evaporator 504 evaporates the refrigerant pressure-reduced by the pressure reducing device 503, thereby allowing the refrigerant to cool an air passing through the evaporator 504.

Here, in the present thirteenth embodiment, as the pressure reducing device 503, a thermostatic expansion valve is used for adjusting an opening degree thereof so that the refrigerant at an outlet side of the evaporator 504 has a predetermined superheat.

A pulley type torque transmitting apparatus 510 transmits a power of the engine E/G through a V belt (not illustrated) to the compressor 501. The pulley type torque transmitting apparatus 510 will be described.

Figure 36:
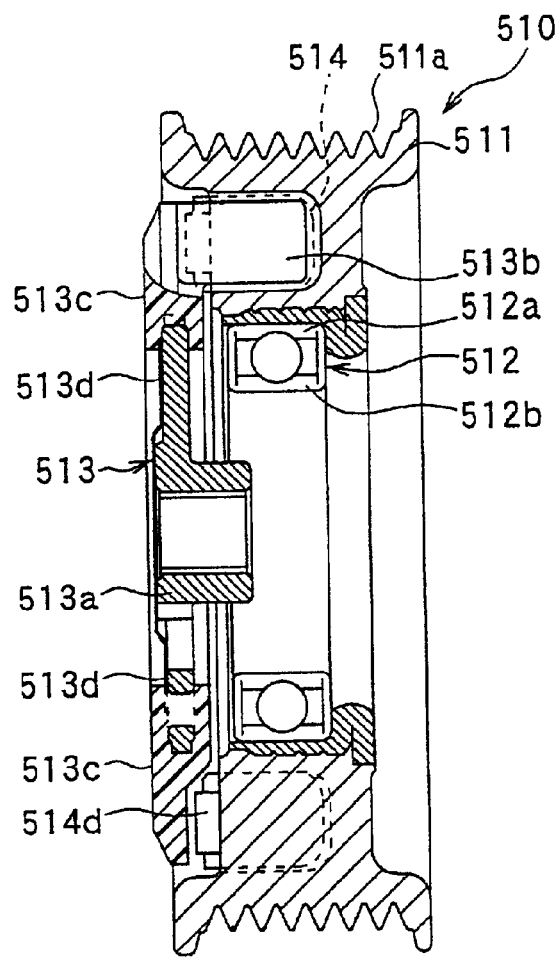
FIG. 36 is a cross-sectional view showing a pulley (thirteenth embodiment)

FIG. 36 is a cross-sectional view showing the pulley type torque transmitting apparatus 510. A metal pulley body 511 includes V grooves 511a for around which a V-belt is hung. The pulley body 511 receives the driving force from the engine E/G and rotates.

A radial bearing 512 supports the pulley body 511 rotatably. An outer race 512a of the radial bearing 512 is press-fitted and fixed into the pulley body 511 and a cylindrical portion formed in a front housing of the compressor 501 is inserted into an inner race 412b. Thus, a radial load induced by the tension of the V belt can be received by the front housing of the compressor 501 without being received by a shaft of the compressor 501.

A center hub 513 is connected to the shaft of the compressor 501 and rotates together with the shaft. The center hub 513 includes a cylindrical portion 513a having a cylindrical inner peripheral surface which is formed with internal threads for coupling with external threads formed on an outer peripheral surface of the shaft, its an annular portion 513c formed with plural projections 513b which receive torque fed from the pulley body 511, and a flange portion 513d which provides a mechanical connection between the annular portion 513c and the cylindrical portion 513a to transfer torque from the annular portion 513c to the cylindrical portion 513a.

The cylindrical portion 513a and the flange portion 513d are formed integrally by molding a metal, while the annular portion 513c is formed by molding a resin, the flange portion 513d and the annular portion 513c are integrally formed by insert molding.

Figure 37:
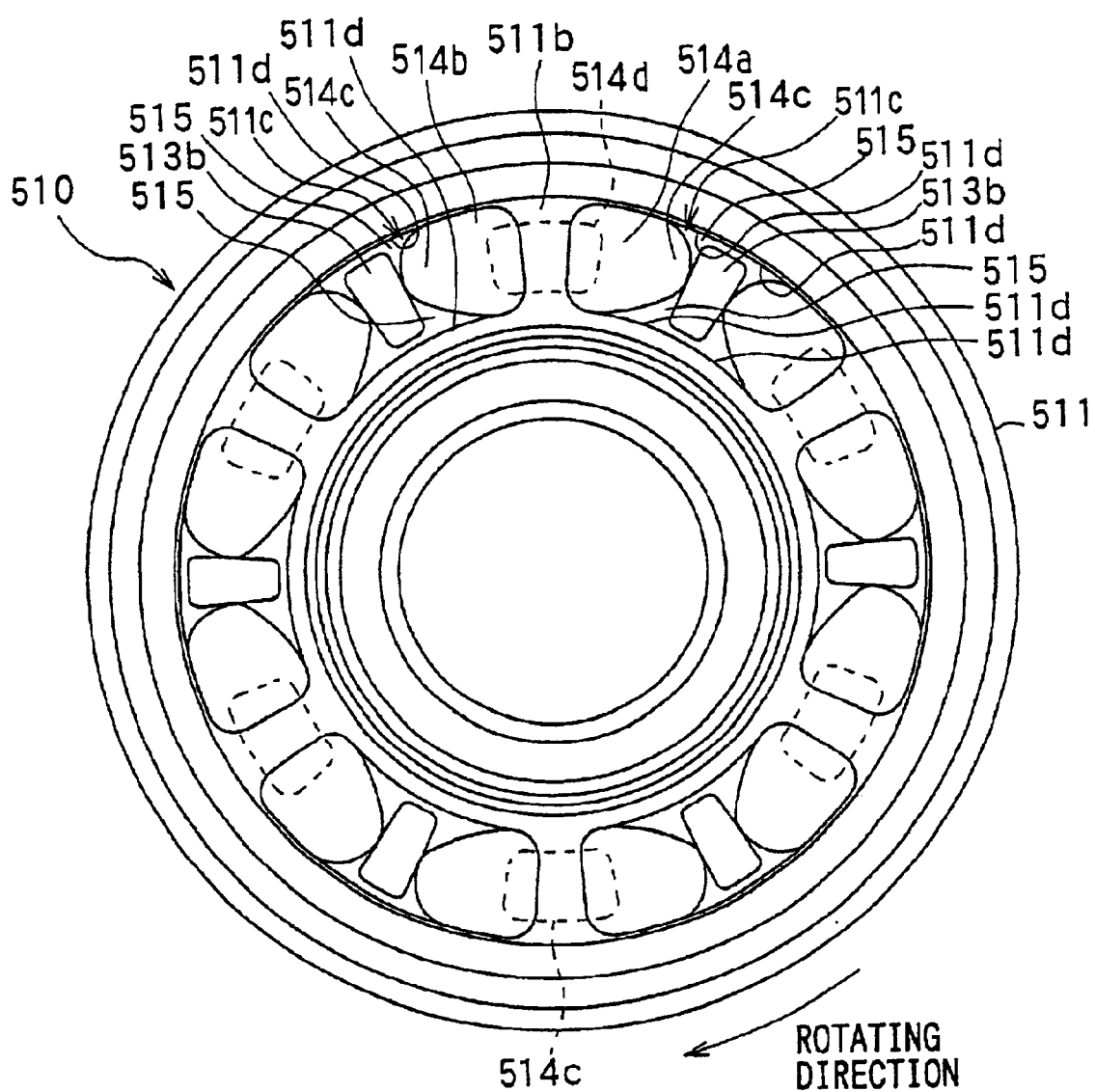
FIG. 37 is a front view showing a pulley body (thirteenth embodiment)
Figure 38:
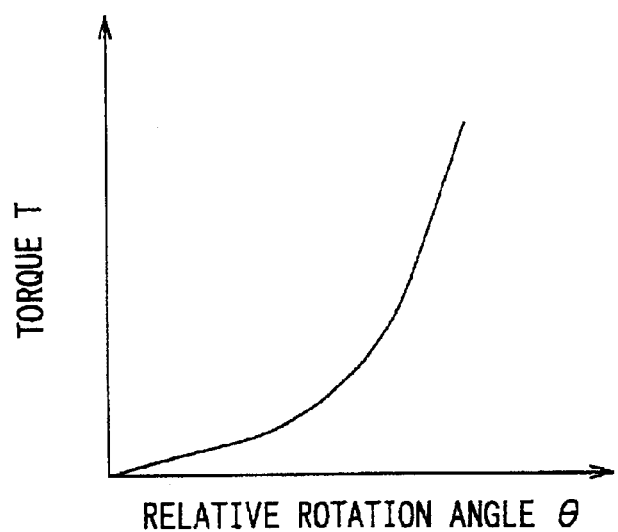
FIG. 38 is a graph showing characteristics of a damper (thirteenth embodiment)

At the portion of the pulley body 511 corresponding to the annular portion 513c there are formed plural projections 511b integrally so as to project from the pulley body 511 toward the annular portion 513c, as shown in FIG. 37. With the pulley body 511 and the center hub 513 mounted to the compressor 501, the projections 513b of the center hub 513 and the projections 511b of the pulley body 511 are positioned alternately around the shaft in the circumferential direction.

A damper 514 to transmit the torque received by the pulley body 511 to the center hub 513 is disposed within a box-shaped space 511c formed between both-projections 511b and 513b. The damper 14 is made of an elastically deformable material (EPDM (ethylene-propylene-diene terpolymer rubber)).

The damper 514 includes a first deforming portion 514a which, when the pulley body 511 for driving the compressor 501 rotates in a direction ("forward direction (arrow direction)" hereinafter) of rotating relatively with respect to the center hub 513, transmits torque from the projections 511b of the pulley body 511 to the projections 513b of the center hub 513 while being deformed compressively under a compressive load, and a second deforming portion 514b which, when the pulley body 511 rotates in a direction ("reverse direction" hereinafter) reverse to the forward direction relatively with respect to the center hub 513, is deformed compressively under a compressive load. The first and second deforming portions 514a, 514b as one set are connected together through a connecting member 514d. Plural such sets of deforming portions, each set being connected through the connecting member 514d, are arranged in the circumferential direction.

In the damper 514, an end portion 514c in a direction nearly parallel to the direction of a compressive load acting on the damper 514 is tapered so as to be smaller in sectional area toward the front end side thereof. Therefore, when a compressive load is not imposed on the damper 514, a gap 515 is formed between an inner wall portion 511d of the space 511c which portion is nearly parallel to the compressive load direction and the damper 514.

In the thirteenth embodiment, the end portion 514c of the damper 514 is tapered so that the cross-sectional area thereof becomes smaller toward the front side thereof, thereby allowing the 515 to be formed between the inner wall of the space 511c and the damper 514 when a compressive load is not imposed on the damper 514. Therefore, when the relative rotational angle θ of the pulley body 511 with respect to the center hub 513 is smaller than the predetermined rotational angle θ1, the damper 514 undergoes a compressive deformation so that the section of the damper 514 nearly orthogonal to the compressive load direction increases its sectional area. When the relative rotational angle θ1 is not less than the predetermined rotational angle θ1, the damper 514 undergoes a compressive deformation in an increase-inhibited state of the sectional area by the inner wall 511d of the space 511c.

In the case where the damper 514 undergoes a compressive deformation so as to induce an increase of the sectional area, the freedom of the deformation is larger than in the case where the damper undergoes a compressive deformation in an increase-inhibited state of the sectional area by the space 511c, so that a change rate ("elastic modulus k" hereinafter) of the compressive load with respect to the relative rotational angle θ in the compressive deformation involving an increase of the sectional area is smaller than the elastic modulus k in the compressive deformation in an increase-inhibited state of the cross-sectional area.

Thus, when the relative rotational angle θ is smaller than the predetermined rotational angle θ1, the damper 514 undergoes a compressive deformation so that the are of contact between the space 511c and the damper 514 increases as the relative rotational angle θ increases. Thus, the damper 514 comes to have a non-linear characteristic such that the larger the relative rotational angle θ, the larger the elastic modulus k.

Therefore, according to the thirteenth embodiment, even if a large torque is exerted on the pulley type torque transmitting apparatus 510, damper 514 can be prevented from exceeding its elastic limit and hence it is possible to absorb a torque variation sufficiently under the transfer of a large torque.

One means for attaining the non-linear characteristic of the damper 514 may be forming a hole in the damper. According to this means, however, the radius of curvature of the hole becomes smaller when the hole collapses under a compressive deformation of the damper 514, so that a stress concentration is apt to occur and the damper 514 may be cracked.

On the other hand, since in this embodiment the non-linear characteristic is attained without forming a hole in the damper 514, a stress concentration is difficult to occur in the damper and hence a crack is difficult to be developed in the damper.

Figure 39:
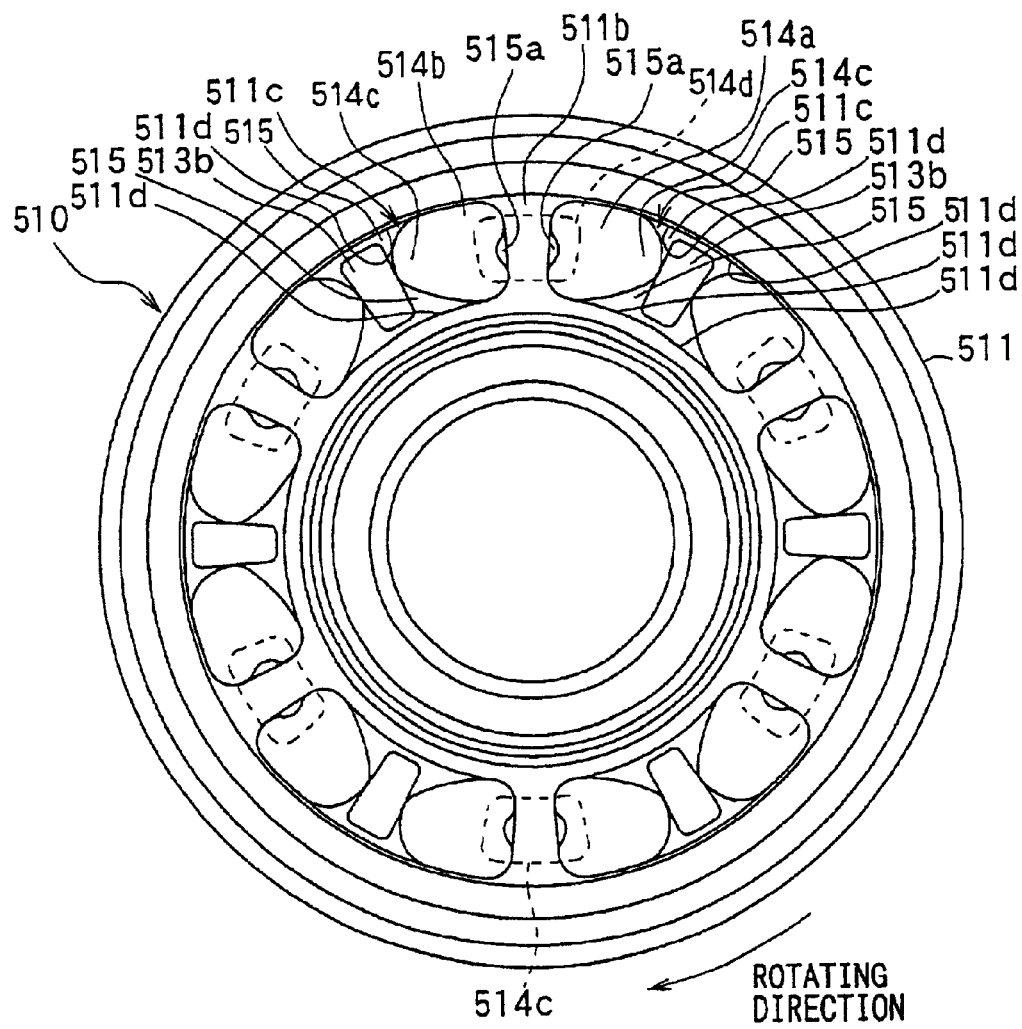
FIG. 39 is a front view showing a modified example of the pulley body (thirteenth embodiment)

In the above-described thirteenth embodiment, the front end side 514c of the damper 514 is tapered and the gap 515 is formed on only the damper front end side 514c. However, the position of the gap 515 is not limited to the front end side 514c of the damper 514 (see FIG. 37). In the present invention, when the relative rotational angle θ is small, the damper 514 is deformed compressively so as to fill up the gap 515, thereby enhancing the deformation freedom of the damper 514 and making the elastic modulus k small. For example, a gap 515a may be formed also in an end portion on the side opposite to the tapered front end side 514c, as shown in FIG. 39. Further, without tapering the damper 514, the space 511c may be expanded on the front end side 514c of the damper 514 to form the gap 515.

In the above-described thirteenth embodiment, the damper 514 is made of rubber (EPDM). Alternatively, the damper 514 may be made of any other material, e.g., elastomer, resin, or metal.

In the above-described thirteenth embodiment, the present invention is applied to the pulley type torque transmitting apparatus 510 which transmits: torque to the compressor 501. Alternatively, the present invention may be applied to any other torque transmitting device.

Figure 40A:
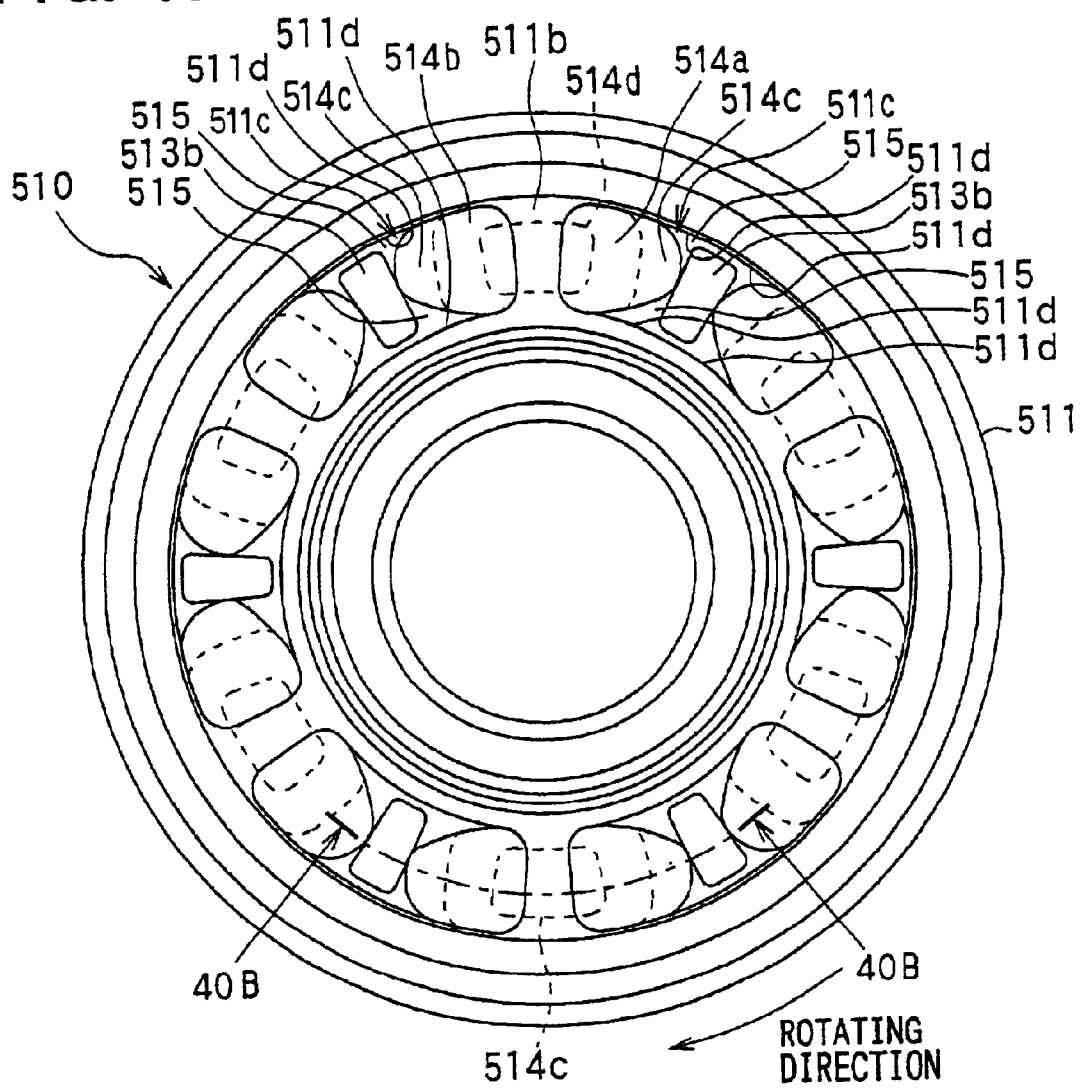
FIG. 40A is a front view of showing a second modified example of the pulley body (thirteenth embodiment)
Figure 40B:
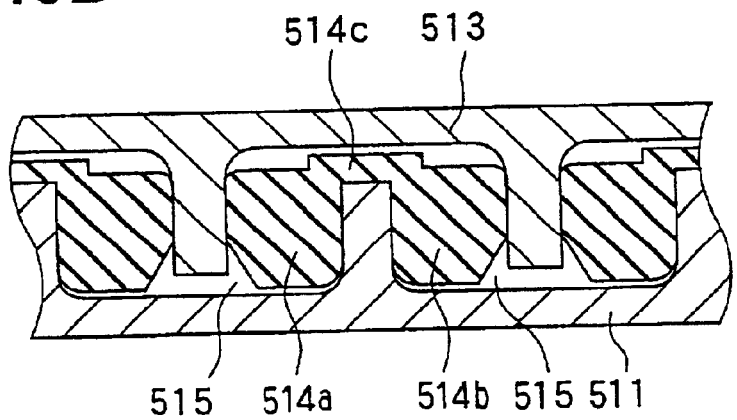
FIG. 40B is a cross-sectional view taken along line 40B—40B in FIG. 40A.

In the above-described thirteenth embodiment, the damper 514 is formed so that the gap 515 is formed when seen in the rotational axis direction of the pulley type torque transmitting apparatus 510. Alternatively, as shown in FIGS. 40A and 40B, the damper 514 or the space 511c may be constituted so that the gap 515 is formed when seen in a direction orthogonal to the rotational axis direction of the pulley type torque transmitting apparatus 510.

What is claimed is:

1. A torque transmitting apparatus for transmitting a torque from a driving source to a rotary device, comprising:
a first rotor driven in a rotating direction upon receipt of the torque from said driving source via a member disposed between said first rotor and said driving source, wherein:
said first rotor receives a radial load in a radial direction thereof from said member while being driven in the rotating direction;
said first rotor includes an outer annular portion, an inner annular portion and a plurality of projections;
the inner annular portion is radially and inwardly spaced from the outer annular portion; and
each projection extends radially and inwardly from the outer annular portion to the inner annular portion and axially extends in a direction generally parallel to a rotational axis of said first rotor;
a radial bearing disposed between the first rotor and a support member, wherein said radial bearing supports the first rotor rotatably on said support member against the radial load on said first rotor;
a second rotor connected to a rotating portion of said rotary device and rotating together with said rotating portion, wherein said second rotor includes a plurality of projections, each of which extends in a direction generally parallel to said rotational axis of said first rotor and is placed between two corresponding projections of said plurality of projections of said first rotor; and
a plurality of pairs of torque transmitting members disposed between said first rotor and said second rotor for transmitting the torque in the rotating direction to said second rotor, wherein:
each torque transmitting member is deformable elastically in the rotating direction and is placed between a corresponding one of said plurality of projections of said first rotor and a corresponding one of said plurality of projections of said second rotor;
each torque transmitting member has a non-linear spring characteristic;
each pair of torque transmitting members is arranged such that said torque transmitting members of each pair are arranged, in the rotating direction, on opposite sides, respectively of a corresponding one of said projections; and
each pair of torque transmitting members is constructed such that said torque transmitting members of said pair are joined together by a connecting member, which is axially positioned between said second rotor and said corresponding one of said projections on one axial side of said corresponding one of said projections.

2. A torque transmitting apparatus according to claim 1, wherein said torque transmitting member is made of rubber or elastomer having a hole.

3. A torque transmitting apparatus according to claim 1, wherein each torque transmitting member is made of rubber or elastomer, and the transmitting member is deformed by flexural deformation in response to torque in the rotating direction that is smaller than a predetermined torque and is deformed by compressive deformation in response to torque in the rotating direction that is larger than the predetermined torque, the deformation amount of the flexural deformation being larger than the deformation amount of the compressive deformation.

4. A torque transmitting apparatus according to claim 1, wherein each torque transmitting member is made of rubber or elastomer, and the transmitting member has a first portion that is deformed by a flexural deformation in response to torque in the rotating direction that is smaller than a predetermined torque and a second portion that is deformed by compressive deformation in response to torque in the rotating direction that is larger than the predetermined torque, the deformation amount of said first portion being larger than the deformation amount of said second portion.

5. A torque transmitting apparatus according to claim 1, wherein each torque transmitting member is made of rubber or elastomer, and the transmitting member has a first portion and a second portion, the first portion being deformed in a first amount by flexural deformation in response to torque in the rotating direction, the second portion being deformed in a second amount by compressive deformation in response to torque in the rotating direction, the first amount being increased more than the second amount as the torque in the rotating direction is increased, wherein the first amount is always larger than the second amount.

6. A torque transmitting apparatus according to claim 1, wherein each torque transmitting member is free from the radial load.

7. A torque transmitting apparatus according to claim 1, wherein said member disposed between said first rotor and, said driving source is a V belt.

8. A torque transmitting apparatus according to claim 1, wherein said support member is a housing of said rotary device.

9. A torque transmitting apparatus according to claim 8, wherein said rotary device is a compressor.

10. A torque transmitting apparatus according to claim 1, wherein each pair of torque transmitting members is constructed such that said torque transmitting members of said pair are tapered in opposite directions, respectively.

11. A torque transmitting apparatus according to claim 1, wherein:
said second rotor further includes a torque limiter mechanism, which disables transmission of said torque from said first rotor to said rotary device when said torque transmitted from said first rotor to said torque limiter mechanism reaches a predetermined torque; and
said torque limiter mechanism is arranged in such a manner that an axial extent of said torque limiter mechanism is within an axial extent of said first rotor.

12. A torque transmitting apparatus for transmitting a torque from a driving source to a rotary device, comprising:
a first rotor driven in a rotating direction upon receipt of the torque from said driving source via a member disposed between said first rotor and said driving source, wherein:
said first rotor receives a radial load in a radial direction thereof from said member while being driven in the rotating direction;
said first rotor includes an outer annular portion, an inner annular portion and a plurality of projections;
said inner annular portion is radially and inwardly spaced from said outer annular portion; and
each protection radially and inwardly extends from said outer annular portion to said inner annular portion, and each projection axially extends in a direction generally parallel to a rotational axis of said first rotor;
a radial bearing disposed between the first rotor and a support member, wherein said radial bearing supports the first rotor rotatably on said support member against the radial load on said first rotor;
a second rotor connected to a rotating portion of said rotary device and rotating together with said rotating portion, wherein said second rotor includes a plurality of projections, each of which extends in a direction generally parallel to said rotational axis of said first rotor and is placed between two corresponding projections of said plurality of projections of said first rotor; and a plurality of pairs of torque transmitting members disposed between said first rotor and said second rotor for transmitting the torque in the rotating direction to said second rotor, wherein:

each torque transmitting member is deformable elastically in the rotating direction and is placed between a corresponding one of said plurality of projections of said first rotor and a corresponding one of said plurality of projections of said second rotor;

each torque transmitting member is deformed by a flexural deformation when an amount of deformation is less than a predetermined amount, and is deformed by a compressive deformation when the amount of deformation is more than the predetermined amount, whereby an elastic modulus of said torque transmitting member at the amount of deformation over the predetermined amount becomes larger than that at the amount of deformation below the predetermined amount;

each pair of torque transmitting members is arranged such that said torque transmitting members of said pair are arranged, in the rotating direction, on opposite sides, respectively, of a corresponding one of said plurality of projections; and each pair of torque transmitting members is constructed such that said torque transmitting members of said pair are joined together by a connecting member, which is axially positioned between said second rotor and said corresponding one of said plurality of projections on one axial side of said corresponding one of said plurality of projections.

13. A torque transmitting apparatus according to claim 12, wherein said torque transmitting member is made of rubber or elastomer having a hole.

* * * * *